United States Patent
Ohtomo et al.

(10) Patent No.: US 10,982,957 B2
(45) Date of Patent: Apr. 20, 2021

(54) SURVEYING SYSTEM

(71) Applicant: TOPCON Corporation, Tokyo-to (JP)

(72) Inventors: Fumio Ohtomo, Saitama (JP); Kaoru Kumagai, Tokyo-to (JP); Satoshi Yanobe, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 345 days.

(21) Appl. No.: 16/044,635

(22) Filed: Jul. 25, 2018

(65) Prior Publication Data
US 2019/0063922 A1 Feb. 28, 2019

(30) Foreign Application Priority Data

Aug. 25, 2017 (JP) .............................. JP2017-161953

(51) Int. Cl.
*G01S 15/00* (2020.01)
*G01C 15/00* (2006.01)
(Continued)

(52) U.S. Cl.
CPC ............ *G01C 15/006* (2013.01); *G01C 1/00* (2013.01); *G01C 3/08* (2013.01); *G01C 15/06* (2013.01)

(58) Field of Classification Search
CPC ........ G01S 17/86; G01S 17/66; G01S 7/4812; G01S 7/4813; G01S 17/42; G01S 17/89;
(Continued)

(56) References Cited

U.S. PATENT DOCUMENTS

| 9,395,174 B2 | 7/2016 | Bridges |
| 9,967,545 B2 | 5/2018 | Tohme |

(Continued)

FOREIGN PATENT DOCUMENTS

| EP | 1130355 A2 | 9/2001 |
| EP | 3056857 A1 | 8/2016 |

(Continued)

OTHER PUBLICATIONS

Notice of Allowance dated Nov. 25, 2019 in co-pending U.S. Appl. No. 16/103,167.

(Continued)

*Primary Examiner* — Luke D Ratcliffe
(74) *Attorney, Agent, or Firm* — Nields, Lemack & Frame, LLC

(57) ABSTRACT

A surveying system comprising a rover having an illuminating lamp for emitting an illumination light, a second azimuth indicator for detecting an azimuth angle of an optical axis of the illumination light, a surveying instrument comprises a surveying instrument main body and a rotary driving unit capable of rotating the surveying instrument main body in at least a left-and-right direction, wherein the surveying instrument main body comprises a first azimuth indicator for detecting an azimuth angle of a reference optical axis, and as arithmetic control module, and wherein the arithmetic control module is configured to calculate the azimuth angle of the reference optical axis which is in parallel or approximately parallel with the optical axis of the illumination light based on the azimuth angle of the optical axis of the illumination light received from the rover and the azimuth angle of the reference optical axis.

15 Claims, 11 Drawing Sheets

(51) Int. Cl.
*G01C 3/08* (2006.01)
*G01C 1/00* (2006.01)
*G01C 15/06* (2006.01)

(58) Field of Classification Search
CPC ....... G01S 7/4817; G01S 7/4811; G02B 5/04; G01C 15/002; H04N 5/2257
See application file for complete search history.

(56) References Cited

U.S. PATENT DOCUMENTS

| | | | |
|---|---|---|---|
| 2006/0176473 A1* | 8/2006 | Yasutomi | G01C 15/002 356/141.3 |
| 2014/0247439 A1 | 9/2014 | Neier et al. | |
| 2016/0012590 A1* | 1/2016 | McFadden | G06T 7/97 382/106 |
| 2016/0238385 A1 | 8/2016 | Ohtomo et al. | |
| 2016/0238708 A1 | 8/2016 | Ohtomo et al. | |
| 2017/0168142 A1* | 6/2017 | Kumagai | G01S 17/86 |
| 2017/0227357 A1 | 8/2017 | Ohtomo et al. | |
| 2019/0063920 A1 | 2/2019 | Nishita | |

FOREIGN PATENT DOCUMENTS

| | | |
|---|---|---|
| EP | 3179209 A1 | 6/2017 |
| JP | 2016-151422 A | 8/2016 |
| JP | 2016-151423 A | 8/2016 |
| JP | 2017-106813 A | 6/2017 |
| JP | 2017-142081 A | 8/2017 |
| WO | 2016/007411 A1 | 1/2016 |

OTHER PUBLICATIONS

European communication dated Jan. 31, 2019 in corresponding European patent application No. 18187573.3.
European communication dated Feb. 15, 2019 in co-pending European patent application No. 18188511.2.

* cited by examiner

SURVEYING SYSTEM

BACKGROUND OF THE INVENTION

The present invention relates to a surveying system which sights a target and performs a distance measurement and an angle measurement.

In general, as a surveying system performing surveys, a surveying system using a surveying instrument such as a total station or the like is known. The surveying system is made of a surveying instrument installed at a known position (known coordinates) and a target instrument installed at a measuring point. The target instrument comprises a reflection part made of a retro-reflector as a target, or a corner cube. The surveying instrument sights the target and performs a distance measurement and an angle measurement regarding the target.

Recently, a data collector is added to the target instrument (hereinafter, the target instrument having the data collector will be referred to as a rover), and the rover and the surveying instrument are configured to be able to wirelessly communicate with each other. The surveying instrument can be controlled by the rover, and a data transmission and reception between the rover and the surveying instrument can be performed.

However, in order that the surveying instrument sights the target, the surveying instrument is turned by 360° while emitting a detection light, a reflected light from the target is detected, and a direction of the surveying instrument is determined. Therefore, since a direction of the rover with respect to the surveying instrument is not estimated in advance and the reflected light from the target is not detected, a turning velocity of the surveying instrument cannot be increased, and it takes a long time to detect the corner cube. Further, in a case where a plurality of rovers is used, it is difficult to identify a predetermined rover.

SUMMARY OF THE INVENTION

It is an object of the present invention to provide a surveying system which can quickly capture an illumination light and perform a measurement of a target.

To attain the object as described above, a surveying system according to the present invention comprises a surveying instrument and a rover, wherein the rover has an illuminating lamp for emitting an illumination light toward the surveying instrument, a second azimuth indicator for detecting an azimuth angle of an optical axis of the illumination light and a second communication module which transmits the azimuth angle of the optical axis of the illumination light to the surveying instrument and capable of data communication with the surveying instrument, the surveying instrument comprises a surveying instrument main body and a rotary driving unit capable of rotating the surveying instrument main body in at least a left-and-right direction, wherein the surveying instrument main body comprises a distance measuring light projecting unit for projecting a distance measuring light, a light receiving unit for receiving a reflected distance measuring light and producing a light receiving signal, a distance measuring unit for performing a distance measurement of an object to be measured based on the light receiving signal, an optical axis deflector provided on a distance measuring optical axis and capable of deflecting the distance measuring optical axis two-dimensionally, a projecting direction detecting module for detecting a deflection angle of the distance measuring optical axis and performing an angle measurement, an image pickup unit having an image pickup optical axis in parallel with a reference optical axis which is the distance measuring optical axis in a condition not deflected by the optical axis deflector, a first azimuth indicator for detecting an azimuth angle of the reference optical axis, a first communication module which receives the azimuth angle of the reference optical axis and capable of data communication with the rover, and an arithmetic control module for controlling a deflecting action of the optical axis deflector and a distance measuring action of the distance measuring unit, and wherein the arithmetic control module is configured to receive the azimuth angle of the optical axis of the illumination light detected from the rover by the second azimuth indicator via the first communication module and to calculate the azimuth angle of the reference optical axis which is in parallel or approximately parallel with the optical axis of the illumination light based on the azimuth angle of the optical axis of the illumination light and the azimuth angle of the reference optical axis detected by the first azimuth indicator.

Further, in the surveying system according to a preferred embodiment, the arithmetic control module rotates the surveying instrument main body in such a manner that the reference optical axis becomes in parallel or approximately parallel with the optical axis of the illumination light, detects the illumination light based on an image acquired by the image pickup unit, acquires a direction of the illuminating lamp based on a detection result of the illumination light, performs a two-dimensional scanning of the distance measuring light around a direction acquired by the optical axis deflector as a center, and performs a distance measurement and an angle measurement along a scanning path.

Further, in the surveying system according to the preferred embodiment, the optical axis deflector comprises a pair of optical prisms rotatable around the distance measuring optical axis as a center and motors individually rotating the optical prisms independently, and wherein the arithmetic control module is configured to control a rotating direction, a rotating speed and a rotation ratio of the pair of optical prisms by a driving control of the motors, to control a deflection by the optical axis deflector, and to scan two-dimensionally the distance measuring light.

Further, in the surveying system according to the preferred embodiment, the illuminating lamp is capable of blinking the illumination light, and the arithmetic control module is configured to detect the illumination light based on an image when the light is turned on and an image when the light is turned off.

Further, in the surveying system according to the preferred embodiment, the arithmetic control module is configured to execute a turning-on of the illuminating lamp and an image pickup of the image pickup unit in synchronization with each other.

Further, in the surveying system according to the preferred embodiment, the synchronization of the turning-on of the illuminating lamp and the image pickup of the image pickup unit is executed by a trigger signal transmitted and received between the first communication module and the second communication module.

Further, in the surveying system according to the preferred embodiment, the rovers are provided in plural, and the arithmetic control module is configured to calculate an average azimuth angle based on the azimuth angles of the optical axes of each of the illumination lights received from each of the rovers and to horizontally rotate the surveying instrument main body in such a manner that the azimuth angle of the reference optical axis becomes the average azimuth angle.

Further, in the surveying system according to the preferred embodiment, each of the illuminating lamps of each of the rovers has different blinking modes, and the arithmetic control module is configured to identify each of the rovers based on each of the blinking modes.

Furthermore, in the surveying system according to the preferred embodiment, the rover has a retro-reflector of a reflection sheet and has a reference point of the rover at a known position with respect to the optical axis of the illumination light, a reference reflection part around the reference point, and an auxiliary reflection part extending in an up-and-down direction of the reference reflection part, wherein the surveying instrument is configured to detect the reference point based on the reflected distance measuring light from the auxiliary reflection part or the reference reflection part, and the arithmetic control module is configured to make the optical axis deflector to scan the distance measuring optical axis around a direction of the reference point, to perform a three-dimensional measurement of the reference reflection part and the auxiliary reflection part, and to acquire a three-dimensional position of the reference point.

According to the present invention, the surveying system comprises a surveying instrument and a rover, wherein the rover has an illuminating lamp for emitting an illumination light toward the surveying instrument, a second azimuth indicator for detecting an azimuth angle of an optical axis of the illumination light and a second communication module which transmits the azimuth angle of the optical axis of the illumination light to the surveying instrument and capable of data communication with the surveying instrument, the surveying instrument comprises a surveying instrument main body and a rotary driving unit capable of rotating the surveying instrument main body in at least a left-and-right direction, wherein the surveying instrument main body comprises a distance measuring light projecting unit for projecting a distance measuring light, a light receiving unit for receiving a reflected distance measuring light and producing a light receiving signal, a distance measuring unit for performing a distance measurement of an object to be measured based on the light receiving signal, an optical axis deflector provided on a distance measuring optical axis and capable of deflecting the distance measuring optical axis two-dimensionally, a projecting direction detecting module for detecting a deflection angle of the distance measuring optical axis and performing an angle measurement, an image pickup unit having an image pickup optical axis in parallel with a reference optical axis which is the distance measuring optical axis in a condition not deflected by the optical axis deflector, a first azimuth indicator for detecting an azimuth angle of the reference optical axis, a first communication module which receives the azimuth angle of the reference optical axis and capable of data communication with the rover, and an arithmetic control module for controlling a deflecting action of the optical axis deflector and a distance measuring action of the distance measuring unit, and wherein the arithmetic control module is configured to receive the azimuth angle of the optical axis of the illumination light detected from the rover by the second azimuth indicator via the first communication module and to calculate the azimuth angle of the reference optical axis which is in parallel or approximately parallel with the optical axis of the illumination light based on the azimuth angle of the optical axis of the illumination light and the azimuth angle of the reference optical axis detected by the first azimuth indicator. As a result, a sighting of the illumination light by the surveying instrument can be easily performed, and a measurement of the object to be measured can be easily performed.

DETAILED DESCRIPTION OF THE PREFERRED EMBODIMENT

A description will be given below on an embodiment of the present invention by referring to the attached drawings.

By referring to FIG. 1, FIG. 2, FIG. 3 and FIG. 4, a description will be given on general features of a surveying system according to the embodiments of the present invention.

Figure 1:
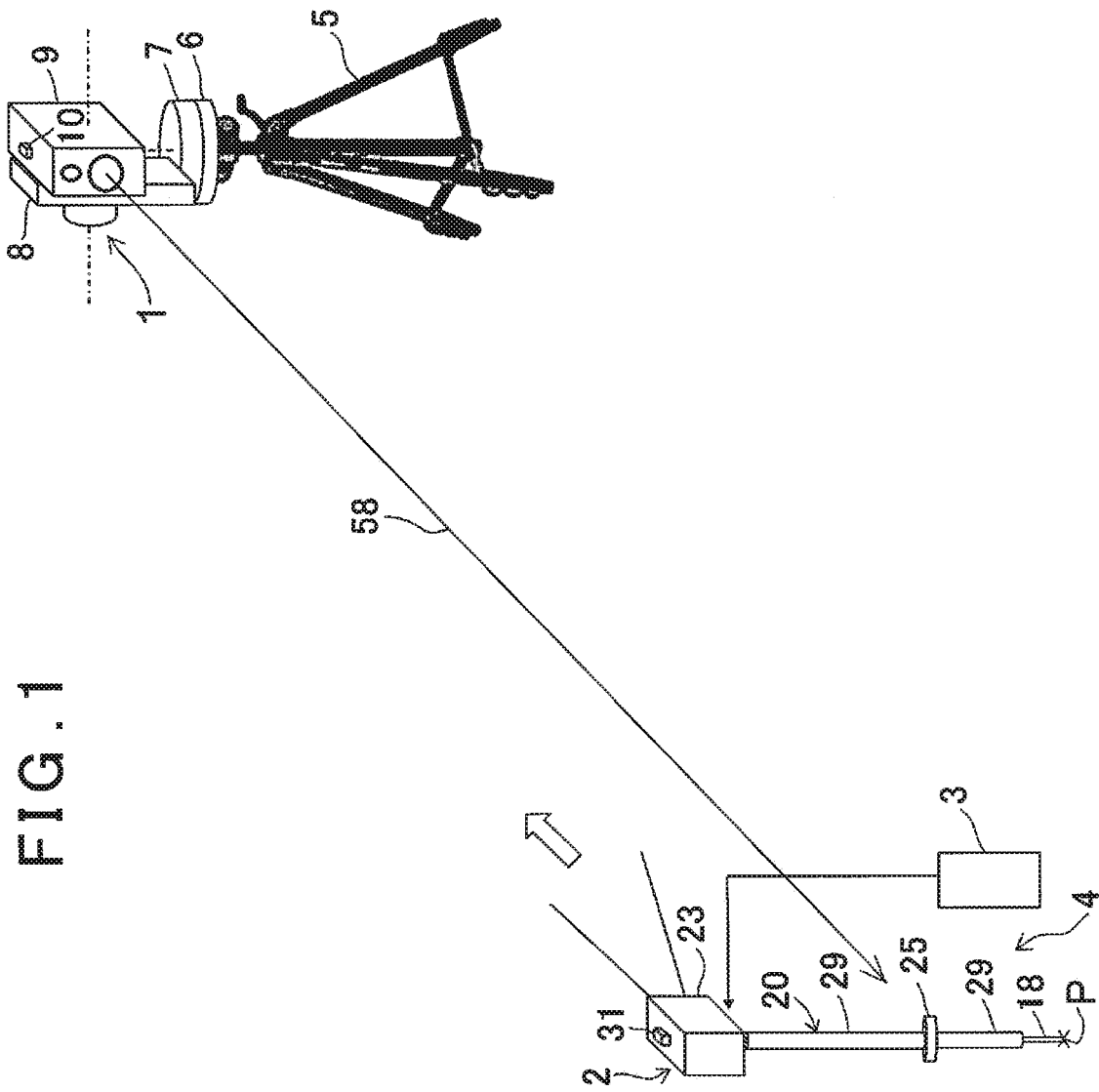
FIG. 1 is a schematical drawing of a surveying system according to an embodiment of the present invention.
Figure 2:
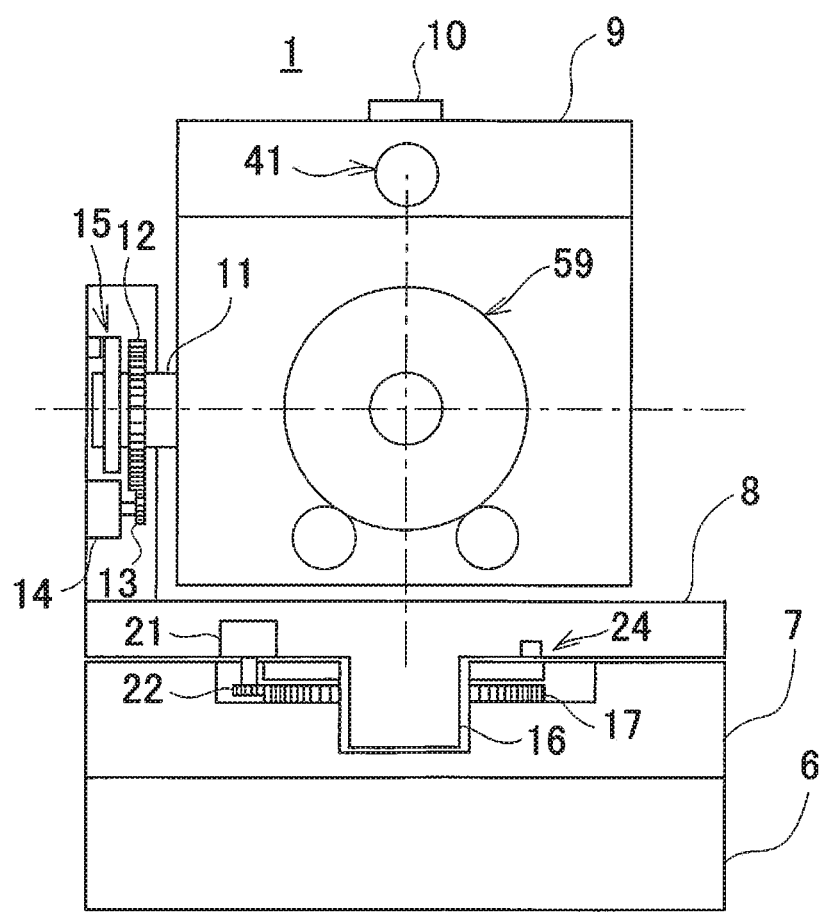
FIG. 2 is a front view to show a surveying instrument according to the embodiment of the present invention.
Figure 3:
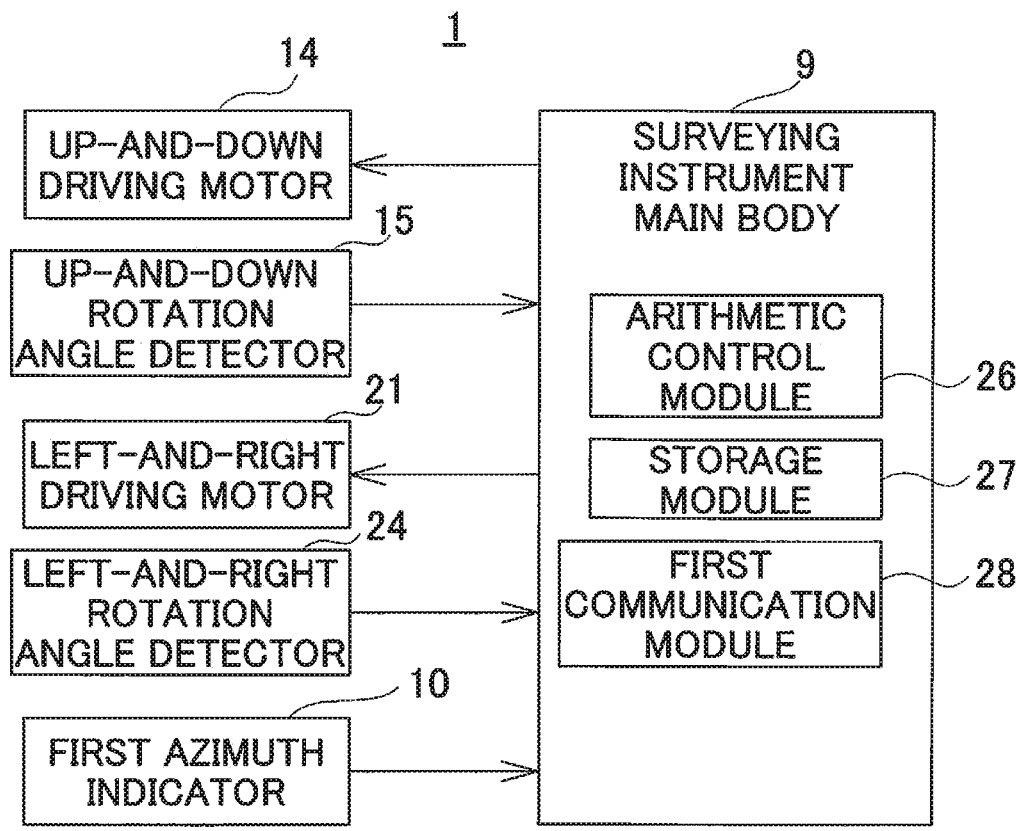
FIG. 3 is a schematical block diagram of the surveying instrument in the surveying system.

In FIG. 1, reference numeral 1 denotes a surveying instrument (for instance, a total station) and is installed at a known point (known coordinates). Further, reference numeral 2 denotes a target instrument, and reference numeral 3 denotes a data collector. It is to be noted that a rover 4 is constituted of the target instrument 2 and the data collector 3.

The surveying instrument 1 primarily has a tripod 5, an installation base 6 provided at an upper end of the tripod 5, a base member 7 provided on the installation base 6, a frame member 8 provided on the base member 7, a surveying instrument main body 9 provided on the frame member 8, and a first azimuth indicator 10 provided at a predetermined position of the surveying instrument main body 9, for instance, on an upper surface of the surveying instrument main body 9. It is to be noted that the first azimuth indicator 10 may be incorporated in the surveying instrument main body 9.

The frame member 8 has an L-shaped cross section having a protruding portion which upwardly protrudes from one end portion. The surveying instrument main body 9 is supported by the protruding portion of the frame member 8 via an up-and-down rotation shaft 11 and is capable of rotating freely around the up-and-down rotation shaft 11 in an up-and-down direction.

An up-and-down driven gear 12 is fitted on an end portion of the up-and-down rotation shaft 11. The up-and-down driven gear 12 meshes with an up-and-down driving gear 13, and the up-and-down driving gear 13 is fixed to an output shaft of an up-and-down driving motor 14. The surveying instrument main body 9 is configured to be rotated in the up-and-down direction by the up-and-down driving motor 14.

Further, an up-and-down rotation angle detector 15 (for instance, an encoder) which detects an up-and-down angle (an angle in a rotating direction around the up-and-down rotation shaft 11) is provided on the end portion of the up-and-down rotation shaft 11. The up-and-down rotation angle detector 15 detects a relative rotation angle of the surveying instrument main body 9 with respect to the frame member 8 in the up-and-down direction.

A left-and-right rotation shaft 16 is protruded from a lower surface of the frame member 8, and the left-and-right rotation shaft 16 as rotatably fitted in the base member 7 via a bearing (not shown). The frame member 8 is capable of rotating freely in a left-and-right direction around the left-and-right rotation shaft 16.

A left-and-right driven gear 17 is fixed to the base member 7 concentrically with the left-and-right rotation shaft 16. A left-and-right driving motor 21 is provided in the frame member 8, and a left-and-right driving gear 22 is fixed to an output shaft of the left-and-right driving motor 21. The left-and-right driving gear 22 meshes with the left-and-right driven gear 17. The left-and-right driving gear 22 is rotated with respect to the left-and-right driven gear 17 by the left-and-right driving motor 21, and the frame member 8 and the left-and-right driving motor 21 integrally rotate in the left-and-right direction.

Further, between the left-and-right rotation shaft 16 and the base member 7, a left-and-right rotation angle detector 24 (for instance, an encoder) which detects a left-and-right angle (an angle in the rotating direction around the left-and-right rotation shaft 16) is provided. The left-and-right rotation angle detector 24 detects a relative rotation angle of the frame member 8 with respect to the base member 7 in the left-and-right direction.

Further, the first azimuth indicator 10 is configured to detect an azimuth of the surveying instrument main body 9 and detect an angle of the surveying instrument main body 9 with respect to a reference optical axis O in a horizontal direction, that is, an azimuth angle of the reference optical axis O. Further, the azimuth angle as detected by the first azimuth indicator 10 is input to an arithmetic control module 26 (to be described later) as an electric signal in real time.

By a cooperative operation between the up-and-down driving motor 14 and the left-and-right driving motor 21, the surveying instrument main body 9 can be directed to a direction as desired. It is to be noted that the frame member 8 and the base member 7 make up a support, unit of the surveying instrument main body 9. Further, the up-and-down driving motor 14 and the left-and-right driving motor 21 make up a rotary driving unit of the surveying instrument main body 9.

The drivings of the up-and-down driving motor 14 and the left-and-right driving motor 21 are controlled by the arithmetic control module 26 (a CPU, for instance) of the surveying instrument main body 9, and it is so configured that a vertical angle and a horizontal angle detected respectively by the up-and-down rotation angle detector 15 and the left-and-right rotation angle detector 24 are input to the arithmetic control module 26. Further, as described below, the surveying instrument main body 9 has a storage module 27 and a first communication module 28. Data acquired by the surveying instrument main body 9, that is, vertical angle data, horizontal angle data, distance measurement data as described below and image data as described below are configured to be stored in the storage module 27 and are transmitted to the data collector 3 via the first communication module 28.

It is to be noted that, in a case where a measurement range by the surveying instrument 1 is within a range of a deflection angle by an optical axis deflector 59 (to be described later) or in a case where an initial setting of a direction of a reference optical axis O (to be described later) of the optical axis deflector 59 is carried out manually, the up-and-down driving motor 14, the up-and-down rotation angle detector 15, the left-and-right driving motor 21, the left-and-right rotation angle detector 24 and the like can be omitted.

The target instrument 2 has a pole 18 which is a rod-like supporting member with a circular cross section, and a reference reflection part 25 provided in the middle of the pole 18 as a target. A reflection sheet as a retro-reflector is wound around an entire circumference of the reference reflection part 25. A reflection sheet 29 as a retro-reflector is also wound around the pole 18 so as to cover the entire circumference in such a manner that the pole 18 is partially exposed above and below respectively. The part where the reflection sheet 29 is wounded around constitutes a linear reflection part 20 having a predetermined length in the up-and-down direction. Each of the reference reflection part 25 and the linear reflection part 20 reflects a distance measuring light respectively, and becomes an object to be measured of the surveying instrument 1. The opposite of the reference reflection part 25 as the target which shows a reference point (to be described later), the linear reflection part 20 is an auxiliary reflection part which makes a detection of the object to be measured and further, a detection of the reference reflection part 25, easier.

A lower end of the pole 18 is designed as a tip capable of indicating a measuring point P. Further, an illuminating lamp 23 is provided on an upper end of the pole 18 via a universal connecting tool (not shown). A position of the illuminating lamp 23 for instance, a distance between the lower end of the pole 18 and a rotation center of the universal connecting tool is already known. Further, a mechanical relationship between the universal connecting tool and the illuminating lamp 23 is already known. Further, a second azimuth indicator 31 is provided at a predetermined position for instance, on an upper surface of the illuminating lamp 23. The second azimuth indicator 31 detects an azimuth an ale of an optical axis of the illuminating lamp 23. Further, the second azimuth indicator 31 has a communicating function and is configured to transmit an azimuth angle detection result by the second azimuth indicator 31 to the data collector 3 as an electric signal in real time. It is to be noted that the second azimuth indicator 31 may be incorporated in, for instance, the illuminating lamp 23.

The universal connecting tool supports the illuminating lamp 23 with respect to the pole 18, capable of tilting in the up-and-down direction and the left-and-right direction, and at least the up-and-down direction. Further, a friction force acts on a rotating part of the universal connecting tool, and the universal connecting tool is configured so that an attitude of the illuminating lamp 23 with respect to the pole 18 is maintained at an arbitrary position.

A radiation angle of an illumination light of the illuminating lamp 23 is approximately 30°. Further, it is preferable that the illuminating lamp 23 has a zoom function and the radiation angle can be reduced to approximately 10°.

The target instrument 2 has a reference point at a predetermined position from the lower end of the pole 18. On the pole 18, the reference reflection part 25 is provided, and a center of the reference reflection part 25 is the reference point. Regarding the reference point, a distance from the lower end of the pole 18 is already known. Further, regarding the reference point, a positional relationship with respect to the illuminating lamp 23 (for instance, a distance from the reference point to the optical axis of the illuminating lamp 23) is also already known.

The reference reflection part 25 is wounded by a reflection sheet on the entire circumference, similarly to the linear reflection part 20. The reference reflection part 25 has a predetermined thickness (a length in an axial direction) larger than a beam diameter of the distance measuring light and is lager with respect to a diameter of the linear reflection part 20.

Here, a diameter difference between the reference reflection part 25 and the linear reflection part 20 is determined in accordance with a measurement accuracy of the surveying instrument main body 9. ½ of this diameter difference, that is, a radius difference only needs to be the measurement accuracy (a measurement error) or more of the surveying instrument main body 9. Further, it is needless to say that the diameter difference is determined in accordance with the diameter of the linear reflection part 20, a measurement condition, a measurement capability of the surveying instrument main body 9 and the like.

In a case of the present embodiment, assuming that a measurement distance is 200 m at maximum, the diameter of the linear reflection part 20 is set to 35 mm, the diameter of the reference reflection part 25 is set to 100 mm, and the thickness of the reference reflection part 25 is set to 30 mm.

Figure 4:
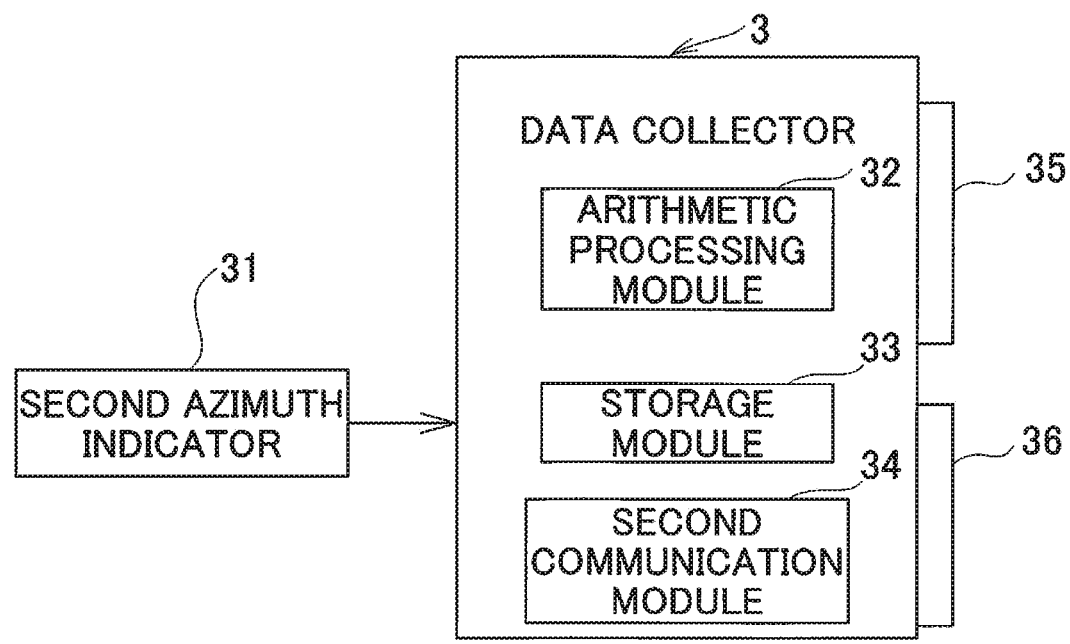
FIG. 4 is a schematical block diagram of a data collector in the surveying system.

As shown in FIG. 4, the data collector 3 comprises an arithmetic processing module 32, a storage module 33, a second communication module 34, a display unit 35 and an operation unit 36. It is to be noted that the display unit 35 may be as a touch panel, the display unit 35 may also serve a function of an operation unit, and the operation unit 36 may be omitted. Further, a terminal such as a smartphone or the like may be used as the data collector 3.

The data collector 3 and the surveying instrument 1 are capable of communicating via the first communication module 28 and the second communication module 34, and the surveying instrument 1 can be remotely controlled via the data collector 3. Further, data such as distance measurement results, angle measurement results and images and the like acquired by the surveying instrument 1 is transmitted to the data collector 3 and stored in the storage module 33. It is to be noted that in the surveying instrument 1, the base member 7 may be attachable and detachable with respect to the installation base 6.

Figure 5:
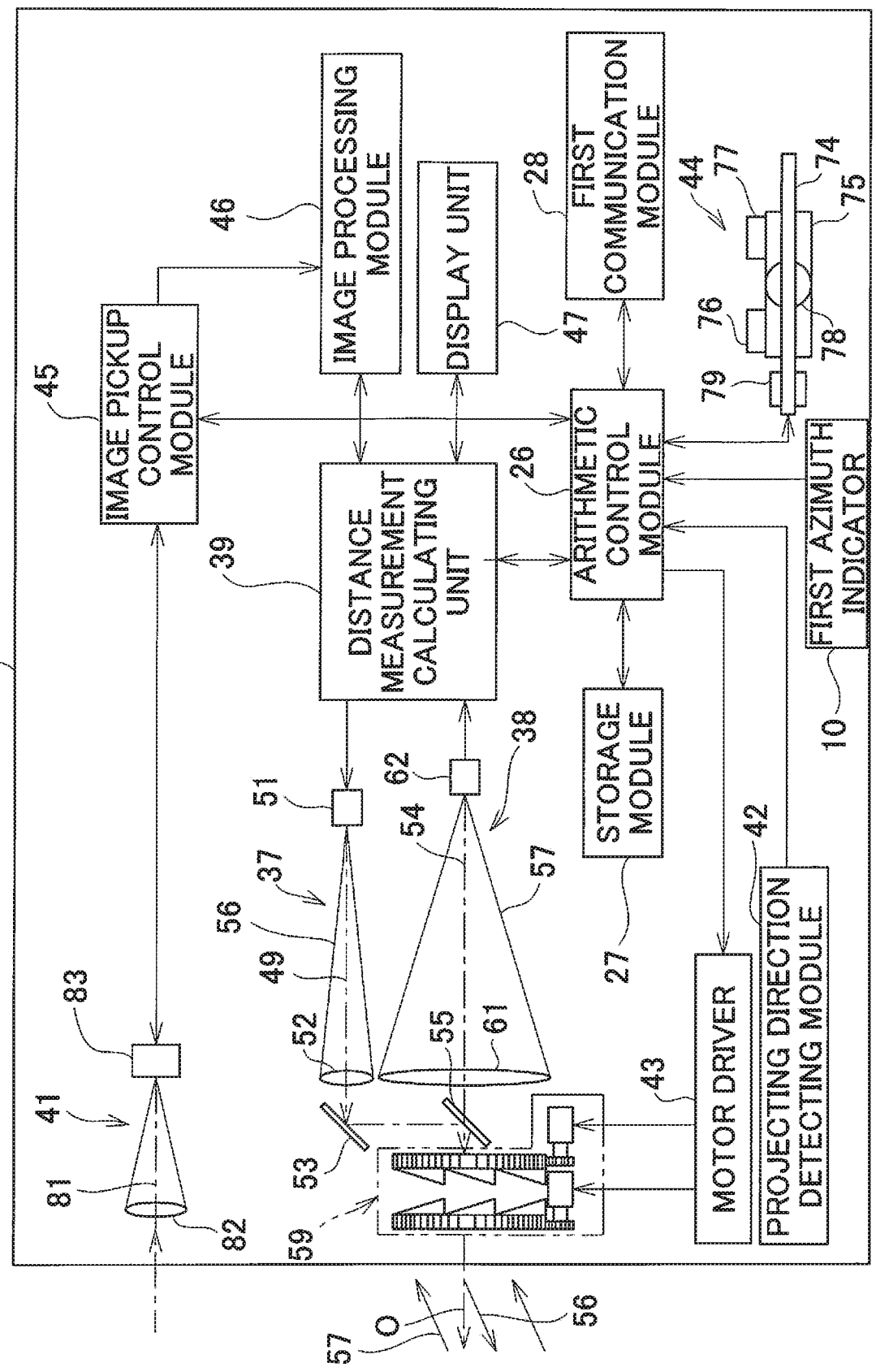
FIG. 5 is a schematical block diagram of a surveying instrument main body in the surveying system.

Next, a description of the surveying instrument main body 9 will be given concretely by referring to FIG. 5.

The surveying instrument main body 9 comprises a distance measuring light projecting unit 37, a light receiving unit 38, a distance measurement calculating unit 39, an image pickup unit 41, a projecting direction detecting module 42, a motor driver 43, an attitude detector 44, the first communication module 28, the arithmetic control module 26, the storage module 27, an image pickup control module 45, an image processing module 46, a display unit 47 and the first azimuth indicator 10, and they are accommodated in a housing 48 and integrated. It is to be noted that the distance measuring light projecting unit 37, the light receiving unit 38, the distance measurement calculating unit 39 or the like constitute a distance measurement unit which functions as an electronic distance meter.

The distance measuring light projecting unit 37 has a projection optical axis 49, and a light emitter 51 such as a laser diode (LD), for instance, is provided on the projection optical axis 49. Further, a projecting lens 52 is provided on the projection optical axis 49. Further, by first reflection mirror 53 as a deflecting optical component provided on the projection optical axis 49 and by a second reflection mirror 55 as a deflecting optical component provided on a light receiving optical axis 54 (to be described later), the projection optical axis 49 is deflected so as to coincide with the light receiving optical axis 54. The first reflection mirror 53 and the second reflection mirror 55 constitute a projection optical axis deflector.

The light emitter 51 emits a pulsed laser beam, and the distance measuring light projecting unit 37 projects the pulsed laser beam emitted from the light emitter 51 as a distance measuring light 56.

A description will be given on the light receiving unit 38. A reflected distance measuring light 57 from the object to be measured enters the light receiving unit 38. The light receiving unit 38 has the light receiving optical axis 54, and the light receiving optical axis 54 coincides with the projection optical axis 49 deflected by the first reflection mirror 53 and the second reflection mirror 55. It is to be noted that a condition where the projection optical axis 49 is coincided with the light receiving optical axis 54 is determined as a distance measuring optical axis 58 (see FIG. 1).

The optical axis deflector 59 (to be described later) is disposed on the deflected projection optical axis 49, that is, on the light receiving optical axis 54. A straight optical axis passing through a center of the optical axis deflector 59 is the reference optical axis O. The reference optical axis O coincides with the projection optical axis 49 or the light receiving optical axis 54 or the distance measuring optical axis 58 when the optical axes 49, 54 or 58 is not deflected by the optical axis deflector 59.

The reflected distance measuring light 57 passes through the optical axis deflector 59 and enters on the light receiving optical axis 54. An image forming lens 61 is disposed on the light receiving optical axis 54. Further, a light receiving element 62, such as a photodiode (PD) or an avalanche photodiode (APD), for instance, is provided on the light receiving optical axis 54. The image forming lens 61 forms an image of the reflected distance measuring light 57 on the light receiving element 62. The light receiving element 62 receives the reflected distance measuring light 57 and produces a light receiving signal. The light receiving signal is input into the distance measurement calculating unit 39, and the distance measurement calculating unit 39 performs a distance measurement to the object to be measured based on the light receiving signal.

Figure 6:
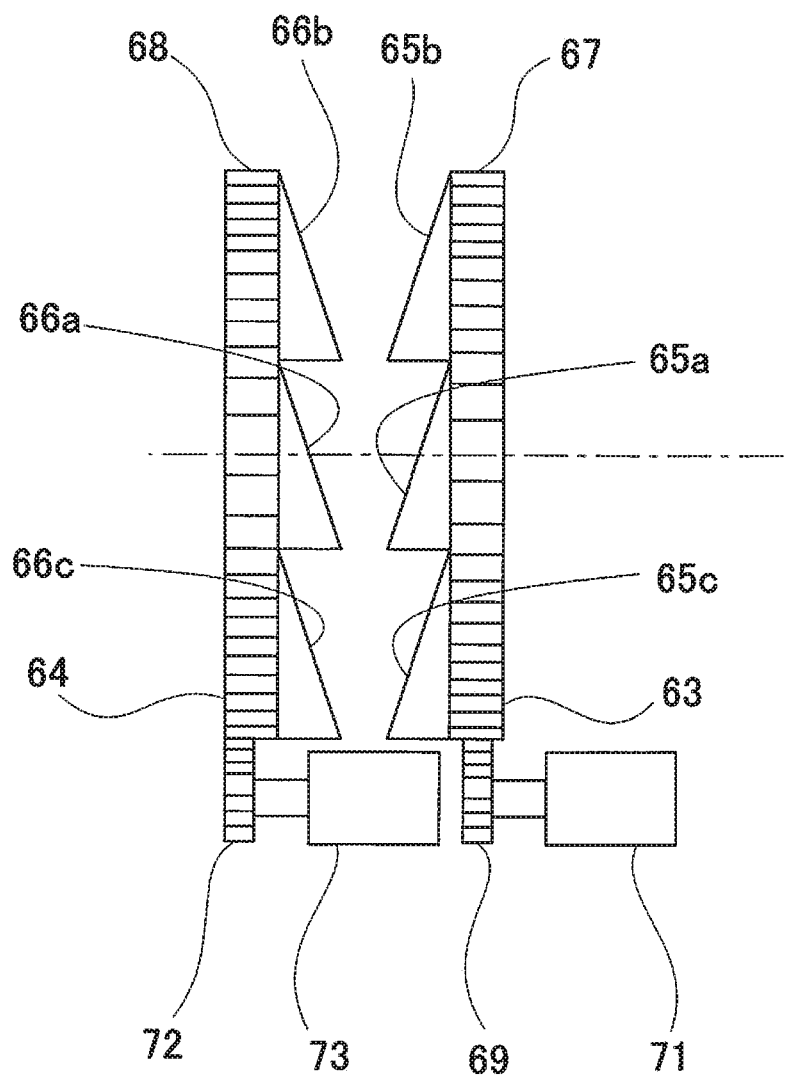
FIG. 6 is a schematical drawing of an optical axis deflector in the surveying instrument main body.

A description will be given on the optical axis deflector 59 by referring to FIG. 6.

The optical axis deflector 59 is constituted of a pair of optical prisms 63 and 64. The optical prisms 63 and 64 are designed in a disk-like shape having the same diameter respectively and disposed concentrically and perpendicularly crossing the light receiving optical axis 54 on the light receiving optical axis 54. Further, the optical prisms 63 and 64 are arranged parallel at a predetermined interval. The optical prism 63 is molded by an optical glass and has three triangular prisms 65*a*, 65*b* and 65*c* arranged parallel. The optical prism 64 is molded by the optical glass and has three triangular prisms 66*a*, 66*b* and 66*c* arranged parallel. It is to be noted that all of the triangular prisms 65*a*, 65*b* and 65*c* and the triangular prisms 66*a*, 66*b* and 66*c* have optical characteristics of the same deflection angle.

It is to be noted that a width of each of the triangular prisms 65*a* and 66*a* located at a center is larger than the beam diameter of the distance measuring light 56, and the distance measuring light 56 is passed through the triangular prisms 65*a* and 66*a* only.

A central part (the triangular prisms 65*a* and 66*a*) of the optical axis deflector 59 is designed as a distance measuring light deflecting unit which is a first optical axis deflector which the distance measuring light 56 passes through and is projected from. A part other than the central part of the optical axis deflector 59 (both end portions of the triangular prisms 65*a* and 66*a*, the triangular prisms 65*b* and 65*c*, and the triangular prisms 66*b* and 66*c*) is designed as a reflected distance measuring light deflecting unit which is a second optical axis deflector which the reflected distance measuring light 57 passes and enters.

The optical prisms 63 and 64 are disposed independently and individually rotatable around the light receiving optical axis 54 as a center, respectively. The optical prisms 63 and 64, when their rotating directions, rotation amounts and rotating speeds are independently controlled, deflect the projection optical axis 49 of the projected distance measuring right 56 in a two-dimensional arbitrary direction, and deflect the light receiving optical axis 54 of the received reflected distance measuring light 57 in parallel to the projection optical axis 49.

An outer shape of each of the optical prisms 63 and 64 is designed as a circle shape around the light receiving optical axis 54 (the reference optical axis O) as the center, respectively. Further, by taking an expansion of the reflected distance measuring light 57 into consideration, diameters of the optical prisms 63 and 64 are set so that a sufficient light amount can be acquired.

A ring gear 67 is fitted with an outer periphery of the optical prism 63, and a ring gear 68 is fitted with an outer periphery of the optical prism 64.

A driving gear 69 meshes with the ring gear 67, and the driving gear 69 is fixed to an output shaft of a motor 71. Similarly, a driving gear 72 meshes with the ring gear 68, and the driving gear 72 is fixed to an output shaft of a motor 73. The motors 71 and 73 are electrically connected to the motor driver 43.

As the motors 71 and 73, a motor capable of detecting a rotation angle or a motor which rotates corresponding to a driving input value such as a pulse motor, for instance, is used. Alternatively, a rotation angle detector which detects a rotation amount (rotation angle) of a motor such as an encoder or the like, for instance, may be used to detect the rotation amounts of the motors 71 and 73. The rotation amounts of the motors 71 and 73 are detected respectively, and the motors 71 and 73 are individually controlled by the motor driver 43. It is to be noted that an encoder may be mounted directly on the ring gears 67 and 68 respectively, and configured so that the rotation angles of the ring gears 67 and 68 are directly detected by the encoders.

The driving gears 69 and 72 and the motors 71 and 73 are provided at positions not interfering with the distance measuring light projecting unit 37, for instance, on lower sides of the ring gears 67 and 68.

The projecting lens 52, the first reflection mirror 53, the second reflection mirror 55, the distance measuring light deflecting unit or the like make up a light projecting optical system. Further, the reflected distance measuring light deflecting unit, the image forming lens 61 or the like make up a light receiving optical system.

The distance measurement calculating unit 39 controls the light emitter 51, and makes the light emitter 51 pulsed-emit or burst-emit (intermittently emit) a laser beam as the distance measuring light 56. The projection optical axis 49 is deflected by the triangular prisms 65*a* and 66*a* (the distance measuring light deflecting unit) so that the distance measuring light 56 is directed toward the object to be measured. The distance measurement is performed under a condition where the distance measuring optical axis 58 sights the object to be measured (the reference reflection part 25).

The reflected distance measuring light 57 as reflected from the object to be measured enters through the triangular prisms 65*b* and 65*c* and the triangular prisms 66*b* and 66*c* (the reflected distance measuring light deflecting unit) and the image forming lens 61 and is received by the light receiving element 62. The light receiving element 62 sends a light receiving signal to the distance measurement calculating unit 39. The distance measurement calculating unit 39 performs a distance measurement of a measuring point (a point irradiated by the distance measuring light) every each pulsed light base on a light receiving signal from the light receiving element 62, and the distance measurement data is stored in the storage module 27.

The projecting direction detecting module 42 detects rotation angles of the motors 71 and 73 by counting driving pulses input to the motors 71 and 73. Alternatively, based on the signals from an encoder, the projecting direction detecting module 42 detects the rotation angle of the motors 71 and 73. Further, the projecting direction detecting module 42 calculates rotational positions of the optical prisms 63 and 64 based on the rotation angles of the motors 71 and 73. Further, the projecting direction detecting module 42 calculates a deflection angle and a projecting direction (a deflecting direction) with respect to the reference optical axis O of the distance measuring light 56 every each pulsed light based on refractive indexes and the rotational positions of the optical prisms 63 and 64. A calculation result (angle measurement result) is input to the arithmetic control module 26 in association with the distance measurement result. It is to be noted that, in a case where the distance measuring light 56 is burst-emitted, the distance measurement, is performed every each intermittent distance measuring light.

The arithmetic control module 26 controls a deflecting action provided by the optical axis deflector 59 by controlling rotating directions and rotating speeds of the motors 71 and 73 and a rotation ratio between the motors 71 and 73. Further, the arithmetic control module 26 calculates a horizontal angle and a vertical angle of the measuring point with respect to the distance measuring optical axis 58 based on a deflection angle and a projecting direction of the distance measuring light 56. Further, the arithmetic control module 26 associates the horizontal angle and the vertical angle regarding the measuring point with the distance measurement data, and hence, three-dimensional data of the object to be measured can be acquired. Thus, the surveying instrument 1 functions as a total station.

Next, a description will be given on the attitude detector 44. It is to be noted that, as the attitude detector 44, an attitude detector disclosed in Japanese Unexamined Patent Application Publication No. 2016-151423 can be used.

A brief description will be given on the attitude detector 44. The attitude detector 44 has a frame 74. The frame 74 is fixed to the housing 48 or fixed to a structural member and is integrated with the surveying instrument main body 9.

A sensor block 75 is mounted on the frame 74 via a gimbal. The sensor block 75 is capable of rotating freely by 360° in two directions around two perpendicular axes as a center, respectively.

A first tilt sensor 76 and a second tilt sensor 77 are mounted on the sensor block 75. The first tilt sensor 76 is for detecting the horizontality with high accuracy, for instance, a tilt detector which allows a detection light to enter a horizontal liquid surface and detects the horizontality based on a change in a reflection angle of a reflected light or a bubble tube which detects a tilt based on a positional change of a sealed air bubble. Further, the second tilt sensor 77 is for detecting a change in a tilt with high responsiveness, for instance, an acceleration sensor.

A relative rotation angle of the sensor block 75 with respect to the frame 74 regarding the two axes is detected by the encoders 78 and 79.

Further, motors (not shown) which rotate the sensor block 75 and maintain its horizontality are provided with respect to the two axes, respectively. The motors are controlled by the arithmetic control module 26 so that the sensor block 75 is maintained horizontally based on detection results from the first tilt sensor 76 and the second tilt sensor 77.

In a case where the sensor block 75 is tilted (in a case where the surveying instrument main body 9 is tilted), the relative rotation angle of the frame 74 with respect to the sensor block 75 (horizontal) is detected by the encoders 78 and 79. Based on the detection results by the encoders 78 and 79, the tilt angle and the tilt direction of the surveying instrument main body 9 are detected.

Since the sensor block 75 is freely rotatably by 360° with respect to the two axes, regardless of what attitude the attitude detector 44 takes, even when the attitude detector 44 is turned upside down, for instance, the attitude detector 44 can perform an attitude detection in all directions.

In the attitude detection, in a case where a high responsiveness is required, the attitude detection and an attitude control are performed based on the detection result of the second tilt sensor 77. However, a detection accuracy of the second tilt sensor 77 is generally poorer in comparison with the first tilt sensor 76.

The attitude detector 44 includes the first tilt sensor 76 with high accuracy and the second tilt sensor 77 with high responsiveness. Therefore, the attitude detector 44 can perform the attitude control based on the detection result of the second tilt sensor 77 and can perform an attitude detection with high accuracy by the first tilt sensor 76.

The arithmetic control module 26 can calibrate the detection result of the second tilt sensor 77 by the detection result of the first tilt sensor 76. That is, in a case where a deviation occurs between the values of the encoders 78 and 79 when the first tilt sensor 76 detects the horizontality, that is, in a case where the deviation occurs between an actual tilt angle and a tilt angle detected by the second tilt sensor 77, the arithmetic control module 26 can calibrate the tilt angle of the second tilt sensor 77 based on the deviation.

Therefore, if a relationship, between the detected tilt angle of the second tilt sensor 77 and a tilt angle determined, based on the horizontality detection by the first tilt sensor 76 and the detection results of the encoders 78 and 79 is acquired in advance, the arithmetic control module 26 can perform a calibration of the tilt angle detected the second tilt sensor 77, and based on this calibration, can improve an accuracy in the attitude detection with high responsiveness by using the second tilt sensor 77.

The arithmetic control module 26 controls the motors based on a signal from the second tilt sensor 77 when a fluctuation in a tilt is large or when a change in the tilt is rapid. Further, the arithmetic control module 26 controls the motors based on a signal from the first tilt sensor 76 when the fluctuation in the tilt is small or when the change in the tilt is slow, that is, in a condition where the first tilt sensor 76 is capable of following up.

It is to be noted that the storage module 27 stores comparison data showing a comparison result of a detection result of the first tilt sensor 76 and a detection result of the second tilt sensor 77. Based on the signal from the first tilt sensor 76, the arithmetic control module 26 calibrates the detection result by the second tilt sensor 77. By this calibration, it is possible to improve the detection result by the second tilt sensor 77 to the detection accuracy of the first tilt sensor 76. Thus, in the attitude detection performed by the attitude detector 44, a high responsiveness can be realized while maintaining a high accuracy.

The image pickup unit 41 has an image pickup optical axis 81 in parallel to the reference optical axis O of the surveying instrument main body 9 and an image pickup lens 82 disposed on the image pickup optical axis 81. The image pickup unit 41 is a camera having a field angle approximately equal to a maximum deflection angle (e.g. ±20°) by the optical prisms 63 and 64 or having a field angle larger than the maximum deflection angle by the optical prisms 63 and 64 such as 50° to 60°, for instance, and the image pickup unit 41 acquires image data including a scanning range of the surveying instrument main body 9. A relationship between the image pickup optical axis 81, the projection optical axis 49 and the reference optical axis O is already known. That is, the image optical axis 81, the projection optical axis 49 and the reference optical axis O are parallel, and further, distances between each of the optical axes are known values. Further, the image pickup unit 41 is capable of acquiring moving images or continuous images.

The image pickup control module 45 controls an image pickup of the image pickup unit 41. When the image pickup unit 41 picks up the moving images or the continuous images, the image pickup control module 45 synchronizes a timing of acquiring frame images constituting the moving images or the continuous images with a timing of scanning (the timing of measuring distance per a pulsed laser beam) by the surveying instrument main body 9. The arithmetic control module 26 also executes an association between the images and the measurement data (distance measurement data and angle measurement data).

An image pickup element 83 of the image pickup unit 41 is a CCD or a CMOS sensor which is an aggregate of pixels, and is configured such that a position of each pixel can be specified on an image element. For instance, each pixel has a pixel coordinate in a coordinate system having the image pickup optical axis 81 as an origin, and the position on the image element can be specified by the image coordinate.

Further, a signal from each pixel includes information of the pixel coordinate and the light receiving signal.

The image processing module 46 performs image processing such as an edge extraction processing, an extraction of feature points, an image tracking processing, an image matching and the like to the image data acquired by the image pickup unit 41, and prepares a gray-scaled image from the image data.

The display unit 47 displays an image acquired by the image pickup unit 41 and displays a measuring state, the measurement data and the like. It is to be noted that the display unit 47 is made as a touch panel and also functions as an operation unit. Further, in a case where a remote operation is to be performed by the data collector 3, the display unit 47 can be omitted.

In the storage module 27, various programs are stored. These programs include: a program for controlling a light emission timing of the light emitter 51, a program for controlling a rotation of the optical axis deflector 59, a program for executing respectively the distance measurement, based on a light receiving timing of the reflected distance measuring light 57, a program for executing respectively the angle measurement based on the refractive indexes and the rotational positions of the optical prisms 63 and 64, a program for calculating three-dimensional data of a plane to be measured based on a distance measurement result and an angle measurement result, a program for controlling the image pickup by the image pickup unit 41, a program for detecting an illumination light from the acquired image data, a program for detecting an attitude of the surveying instrument main body 9 based on a detection result of the attitude detector 44, a program for preparing an image with three-dimensional data in which three-dimensional coordinates are given for each pixel based on the measurement data (distance measurement data and angle measurement data) and the images, a program for controlling a communication between the surveying instrument 1 and the rover 4, and other programs.

Each of the programs stored in the storage module 27 is executed or opened by the arithmetic control module 26 or the like, and various processings are carried out.

A description of a deflecting action and a scan action of the optical axis deflector 59 will be given by referring to FIG. 7A, FIG. 7B and FIG. 7C.

Figure 7A:
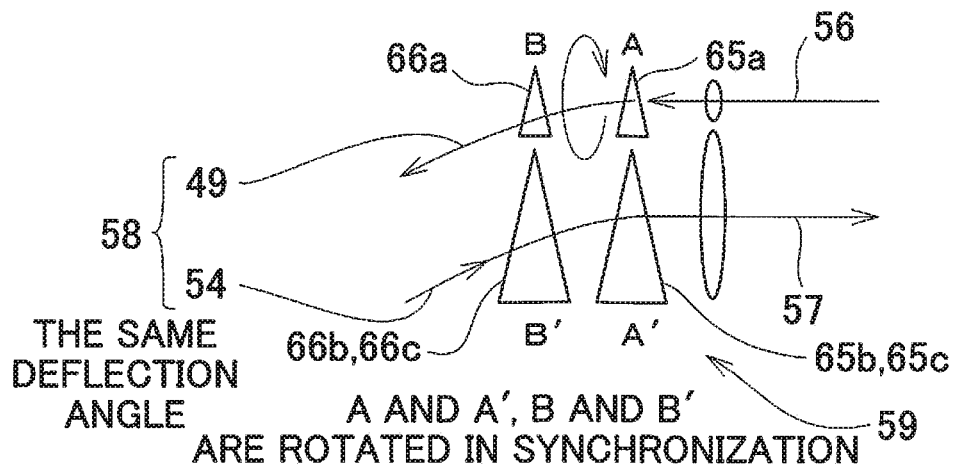
FIG. 7A, FIG. 7B and FIG. 7C are drawings to explain an operation of the optical axis deflector.

It is to be noted that, to simplify an explanation, in FIG. 7A, the optical prisms 63 and 64 are shown by separating the triangular prisms 65a and 66a and the triangular prisms 65b, 65c and 66c. Further, FIG. 7A shows a condition where the triangular prisms 65a and 66a and the triangular prisms 65b, 65c, 66b and 66c are positioned in the same direction, and the maximum deflection angle (e.g. ±20°) is obtained in this condition. Further, the minimum deflection angle is a position where either one of the optical prisms 63 and 64 is rotated by 180°, mutual optical actions of the optical prisms 63 and 64 are offset, and the deflection angle becomes 0°. Therefore, the optical axis (the distance measuring optical axis 58) of the pulsed laser beam, as projected and received through the optical prisms 63 and 64, coincides with the reference optical axis O.

The distance measuring light 56 is emitted from the light emitter 51, and the distance measuring light 56 is turned to a parallel luminous flux by the projecting lens 52 is projected toward the object to be measured through the distance measuring light deflecting unit (the triangular prisms 65a and 66a). Here, by passing through the distance measuring light deflecting unit, the distance measuring light 56 is deflected by the triangular prisms 65a and 66a in a required direction and is projected (FIG. 7A).

The reflected distance measuring light 57 reflected by the object to be measured is entered through the reflected distance measuring light deflecting unit and is focused on the light receiving element 62 by the image forming lens 61.

When the reflected distance measuring light 57 passes through the reflected distance measuring light deflecting unit, an optical axis of the reflected distance measuring light 57 is deflected by the triangular prisms 65b and 65c and the triangular prisms 66b and 66c so as to coincide with the light receiving optical axis 54 (FIG. 7A).

By combining a rotational position of the optical prism 63 with a rotational position of the optical prism 64, a deflecting direction and a deflection angle of the distance measuring light 56 to be projected can be arbitrarily changed.

Further, in a condition where a positional relationship between the optical prism 63 and the optical prism 64 is fixed (that is, in a condition where a deflection angle obtained by the optical prism 63 and the optical prism 64 is fixed), the optical prism 63 and the optical prism 64 are integrally rotated by the motors 71 and 73. A locus drawn by the distance measuring light 56 passing through the distance measuring light deflecting unit becomes a circle around the reference optical axis O (see FIG. 5) as a center.

Therefore, when the optical axis deflector 59 is rotated while emitting a laser beam from the light emitter 51, the distance measuring light 56 can be scanned by a circular locus. It is to be noted that it is needless to say that the reflected distance measuring light deflecting unit integrally rotates with the distance measuring light deflecting unit.

Figure 7B:
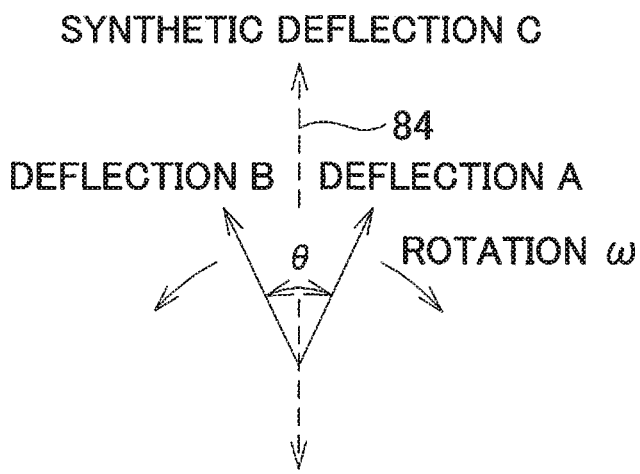

FIG. 7B shows a case where the optical prism 63 and the optical prism 64 are relatively rotated. Assuming that a deflecting direction of the optical axis deflected by the optical prism 63 is a deflection "A" and a deflecting direction of the optical axis deflected by the optical prism 64 is a deflection "B", the deflection of the optical axes by the optical prisms 63 and 64 becomes a synthetic deflection "C" as an angular difference θ between the optical prisms 63 and 64.

Therefore, in a case where the optical prism 63 and the optical prism 64 are synchronized in opposite directions and reciprocally rotated at an equal speed, the distance measuring light 56 passing through the optical prisms 63 and 64 is linearly scanned. Therefore, by reciprocally rotating the optical prism 63 and the optical prism 64 in the opposite directions at the equal speed, as shown in FIG. 7B, the distance measuring light 56 can be made to reciprocally scan in a direction of the synthetic deflection C with a linear locus 84.

Figure 7C:
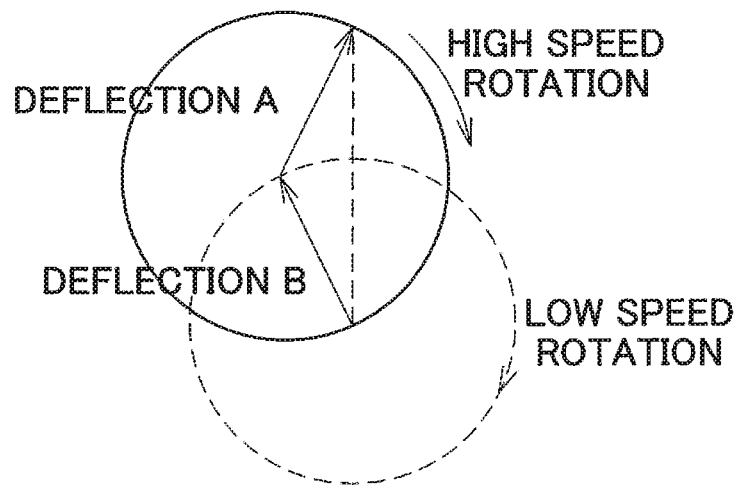

Further, as shown in FIG. 7C, when the optical prism 64 is rotated at a rotating speed lower than a rotating speed of the optical prism 63, the distance measuring light 56 is rotated while the angular difference θ gradually increases. Therefore, the scan locus of the distance measuring light 56 becomes a spiral form.

Further, by individually controlling the rotating directions and the rotating speeds of the optical prism 63 and the optical prism 64, the scan locus of the distance measuring light 56 is performed, in a radial direction (in the direction of radius) with the reference optical axis O as the center, or is performed in the horizontal direction or in the vertical direction, or the like, and thereby, various two-dimensional scanning patterns can be obtained.

Furthermore, by synthesizing the horizontal scan and the vertical scan, two-dimensional scan is made possible. Further, a two-dimensional closed loop scanning pattern with a center can be realized, and in this case, the center of the scanning pattern is coincided with the measuring point. Further, the center of the scanning pattern is coincided with the distance measuring optical axis 56.

Figure 8:
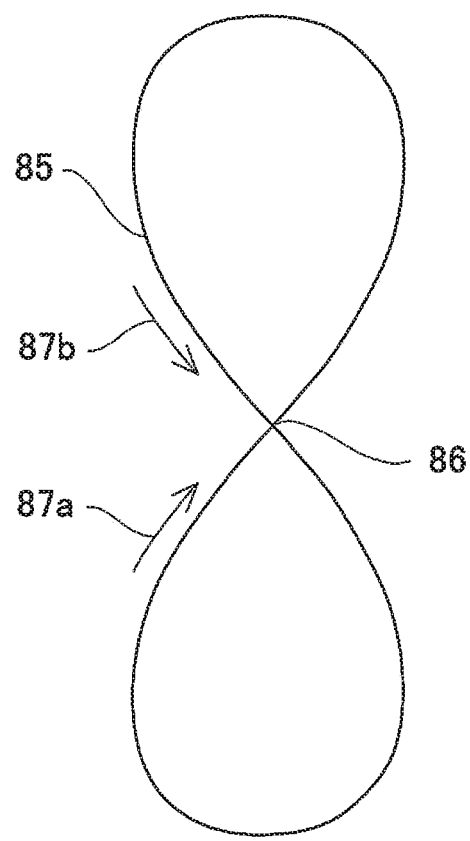
FIG. 8 is a drawing to show one example of a scanning pattern acquired by the optical axis deflector.

FIG. 8 shows one example of a scanning pattern 85 which is a two-dimensional closed loop scanning pattern in a case where the object to be measured (the linear reflection part 20 and/or the reference reflection part 25 of the target instrument) is searched.

By the combination of the rotating directions, the rotating speeds and the rotation ratio of the optical prism 63 and the optical prism 64, the scanning pattern 85 in which an outward scan 87a and an inward scan 87b cross each other at a center (intersection 86) of the scanning pattern can be formed. For instance, by setting the rotation ratio between the optical prism 63 and the optical prism 64 to 1:2, the scanning can be performed in a shape of a numeral 8.

By referring to FIG. 9A, FIG. 9B, FIG. 10, FIG. 11, FIG. 12, FIG. 13 and FIG. 14, a description will be given on actions of the present embodiment.

A measuring work in the present embodiment is carried out by a single operator.

Figure 9A:
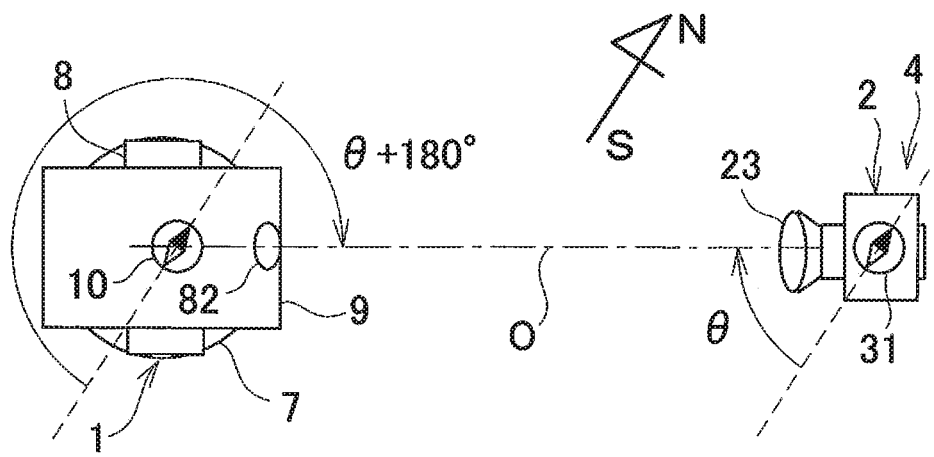
FIG. 9A is a plan view to explain a direction of the surveying instrument main body and a direction of a rover.
Figure 9B:
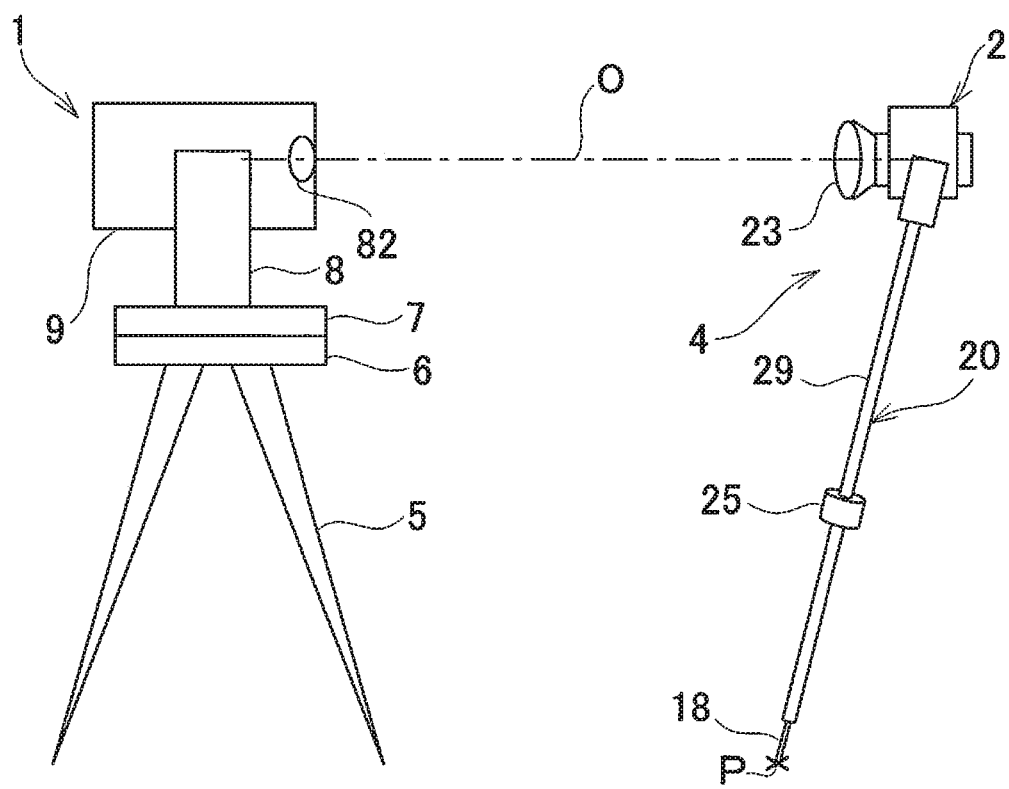
FIG. 9B is a front view to explain the direction of the surveying instrument main body and the direction of the rover.
Figure 10:
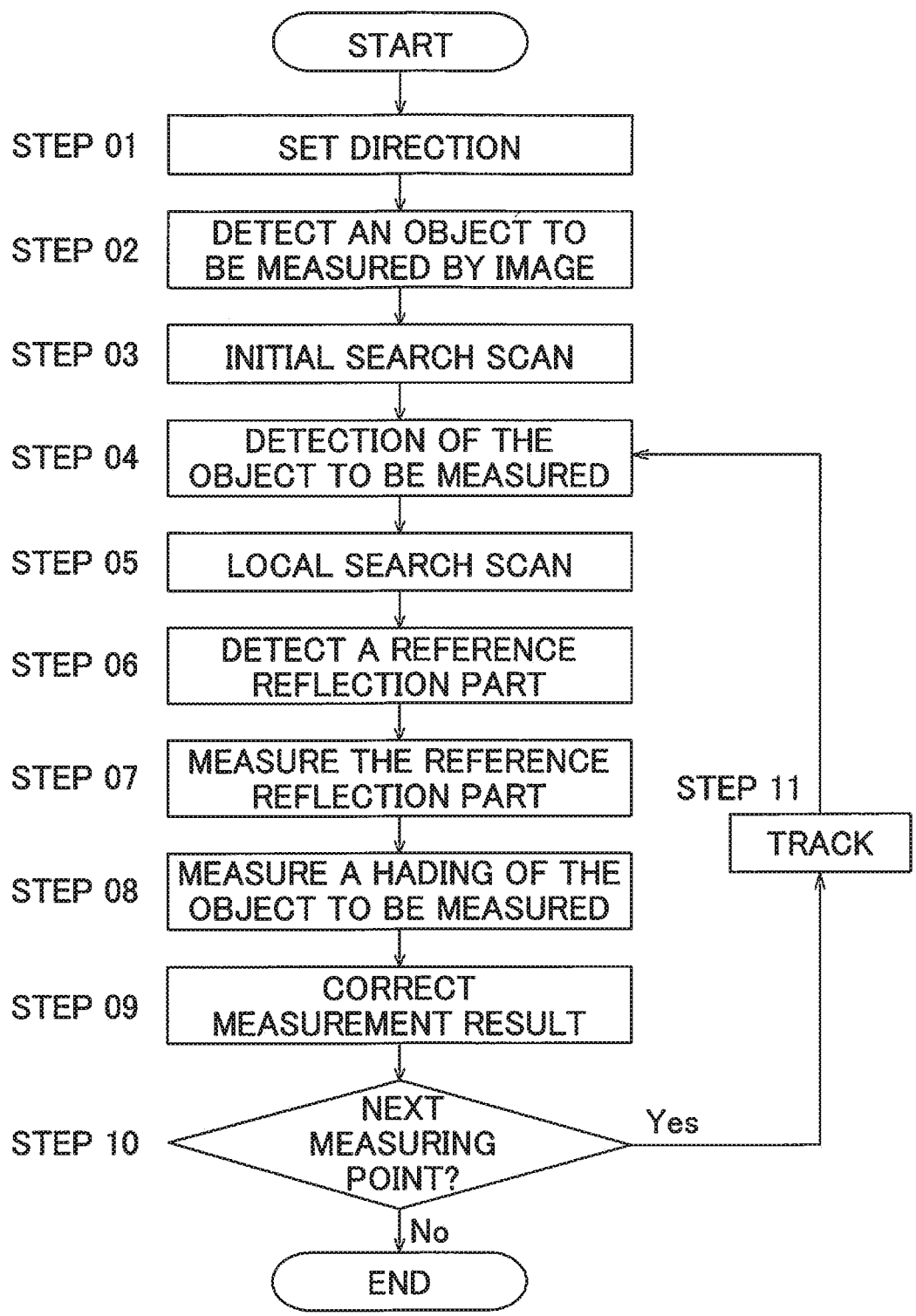
FIG. 10 is a flowchart to show an operation of the present embodiment.

As shown in FIG. 9A, the first azimuth indicator 10 is provided on the surveying instrument main body 9. Based on a detection result of the first azimuth indicator 10, the arithmetic control module 26 can acquire an azimuth angle of the reference optical axis O with respect to a reference direction, for instance, an azimuth angle with respect to the south. Further, the second azimuth indicator 31 is provided on the illuminating lamp 23. The second azimuth indicator 31 can acquire an azimuth angle of an optical axis of the illumination light emitted from the illuminating lamp 23.

(Step 01) First, the surveying instrument 1 is installed at a known point (a point having known coordinates). Since the attitude (the tilt, the tilt direction) of the surveying instrument 1 in the installed state is detected by the attitude detector 44, a leveling of the surveying instrument 1 can be omitted.

After the installation of the surveying instrument 1, a command to start sighting is input from the data collector 3. An operator moves the rover 4 to a predetermined measuring point P and installs a lower end of the pole 18 at a measuring point P. Further, the illuminating lamp 23 is substantially directed toward the surveying instrument, main body 9 so that the illumination light emitted from the illuminating lamp 23 falls within an image pickup range of the image pickup unit 41. It is to be noted that the illuminating lamp 23 may continuously emit the illumination light or may blink the illumination light in a predetermined pattern. In a case where the illumination light blinks, in such a manner that the arithmetic control module 26 detects a blinking pattern, the arithmetic control module 26 can identify the illumination light from the illuminating lamp 23. Further, when an image of when the light is turned on and an image of when the image is turned off are acquired in synchronization with a blinking of the illuminating lamp 23 and a difference between the images is acquired, an image of the illumination light from which noises are removed can be acquired. It is to be noted that a synchronization of the blinking of the illuminating lamp 23 and the image pickup of the image pickup unit 41 are performed, for instance, by a communication of trigger signals between the communication modules 28 and 34.

Here, the illuminating lamp 23 is provided at the upper end of the pole 18 via the universal connecting tool. Therefore, the illuminating lamp 23 can be directed toward the surveying instrument main body 9 without vertically leveling the pole 18. That is, the pole 18 of when the rover 4 is installed may tilt at an arbitrary angle.

When the illuminating lamp 23 is directed toward the surveying instrument main body 9, the second azimuth indicator 31 detects an azimuth angle θ of the optical axis of the illuminating lamp 23 at that moment. The detected azimuth angle θ is input to the arithmetic processing module 32 and is transmitted to the surveying instrument main body 9 via the second communication module 34.

The azimuth angle θ from the rover 4 is received by the surveying instrument main body 9 via the first communication module 28 and is detected as an irradiating direction (azimuth angle of the optical axis of the illumination light) of the illumination light. The arithmetic control module 26 drives the left-and-right driving motor 21 based on the azimuth angle θ and rotates the surveying instrument main body 9 via the frame member 8 so that the azimuth angle of the reference optical axis O of the surveying instrument main body 9 becomes θ+180°. That is, the arithmetic control module 26 sets a direction of the reference optical axis O to be parallel to the optical axis of the illumination light.

When the azimuth angle of the reference optical axis O is set to θ+180°, the reference optical axis O and the optical axis of the illumination light as emitted from the illuminating lamp 23 become in opposite directions and parallel to each other, and the surveying instrument main body 9 and the rover 4 are faced or approximately faced with each other. Thereby, since the illumination light falls within the range of the field angle of the image pickup unit 41, the arithmetic control module 26 can detect the illumination light from the image.

It is to be noted that since the image pickup element 83 receives not only the illumination light but also an external light such as a natural light or the like, there is a possibility that the image pickup unit 41 may receive the external light other than the illumination light. In the present embodiment, since a direction of the illumination light can be calculated based on a detection result of the second azimuth indicator 31, the arithmetic control module 26 can detect only a light which is positioned in a predetermined range as the illumination light based on the calculated direction. Therefore, a light which is not positioned in the predetermined range can be determined and excluded as the external light or the like, and a detection accuracy for the illumination light can be improved.

Further, it may be so configured that a wavelength of the illumination light is restricted and a filter which allows only the illumination light to pass through is provided on the image pickup optical axis 81, so that only the illumination light is received by the image pickup element 83.

It is to be noted that a detection of the illumination light by the arithmetic control module 26 is performed in real time while the measuring work is being performed.

(Step 02) After the detection of the illumination light by the arithmetic control module 26, a command to start a measurement is transmitted to the surveying instrument 1 by the data collector 3. In the surveying instrument 1, based on the command to start the measurement, an image of the illuminating lamp 23 is acquired by the image pickup unit 41. As described above, the field angle of the image pickup unit 41 is as wide enough as 40° to 50° or 30° to 40°. Therefore, even if the surveying instrument main body 9 and the target instrument 2 are not accurately faced with each other, that is, if the target instrument 2 is directed to an approximate direction of the surveying instrument main body 9, the image pickup unit 41 can reliably capture the illumination light of the illuminating lamp 23, that is, the illuminating lamp 23.

The arithmetic control module 26 calculates a position of the illuminating lamp 23 (a center of the illumination light) from the image, and further, calculates the direction (the horizontal angle and the vertical angle) of the reference reflection part 25 based on the known positional relationship between the illuminating lamp 23 and the reference reflection part 25.

Based on this calculation result, the arithmetic control module 26 controls the up-and-down driving motor 14 and the left-and-right driving motor 21 and directs the distance measuring optical axis 58 of the surveying instrument 1 toward the reference reflection part 25. In a condition where the distance measuring optical axis 58 directed toward the reference reflection part 25, the reference reflection part 25 exists approximately at the center of the image picked up by the image pickup unit 41.

(Step 03) The arithmetic control module 26 emits the distance measuring light 56 from the distance measuring light projecting unit 37, controls the rotation of the optical prisms 63 and 64, and based on the acquired direction (the horizontal angle and the vertical angle) of the reference reflection part 25, two-dimensionally searches and scans near the reference reflection part 25.

In the two-dimensional search and scan, an initial search scan with a wide search range and a local search scan limited to a narrow range including the object to be measured are executed. First, the initial search scan for detecting the rover 4 is executed. Here, since the search operation is only to rotate the optical prisms 63 and 64 with small masses, the operation can be performed at an extremely high speed.

In a description as given below, the two-dimensional scanning pattern 85 in the shape of the numeral 8 is adopted as a pattern of the search scan.

Figure 11:
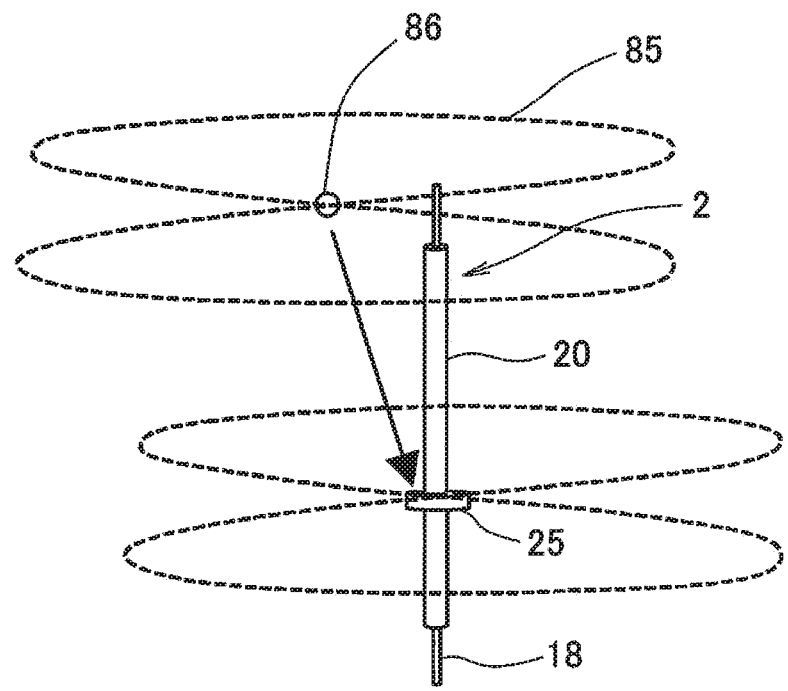
FIG. 11 is an explanatory drawing to show a relationship between the scanning pattern and an object to be measured.

A shape of the scanning pattern 85 in the initial search scan at the start of the search is a flat shape of numeral 8 in the horizontal direction, as shown in FIG. 11.

Since the linear reflection part 20 is elongated in the vertical direction, by flattening the scanning pattern 85, a high-speed search in a wide range become possible. It is to be noted that in the initial search scan, it is preferable to have a flat shape in the horizontal direction, regardless of the shape of the scanning pattern.

When the scanning pattern 85 is carried out so that a path of the scanning pattern 85 in the initial search scan and the linear reflection part 20 cross each other, the reflected distance measuring light 57 can be obtained from the linear reflection part 20. Since the arithmetic control module 26 also executes the distance measurement and the angle measurement together with the execution of the scanning pattern 85, the position of the linear reflection part 20 in the horizontal direction can be immediately measured based on the reflected distance measuring light 57 from the linear reflection part 20.

(Step 04) The arithmetic control module 26 controls the optical axis deflector 59 based on the measurement result, and then, moves the intersection 86 along the linear reflection part 20 until the reference reflection part 25 is detected by the scanning pattern 85 (in FIG. 11, the intersection 86 is moved downward).

Figure 12:
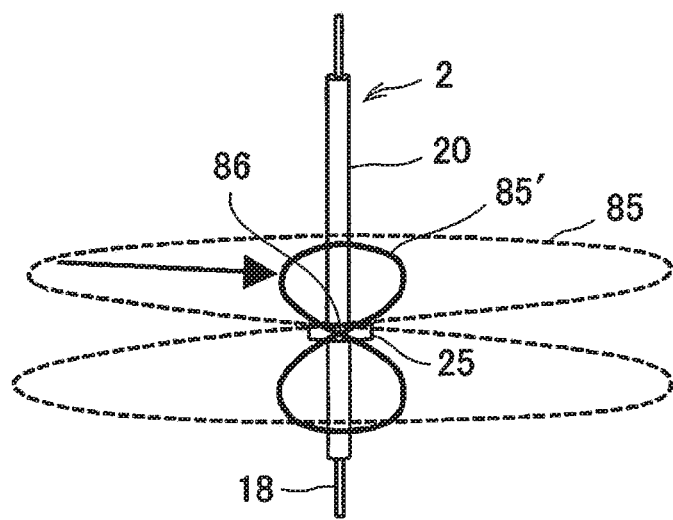
FIG. 12 an explanatory drawing to show a relationship between the scanning pattern, a local scanning pattern and the object to be measured.

(Step 05) When the reference reflection part 25 is detected by the scanning pattern 85, the arithmetic control module 26 changes the scanning pattern 85 to a two-dimensional local scanning pattern 85' suitable for a detection of a central position of the reference reflection part 25 (see FIG. 12). The local scanning pattern 85' has a narrow search range and a vertically elongated shape. Here, since the reference reflection part 25 is protruded than the linear reflection part 20 in a radial direction, the detection of the reference reflection part 25 can be confirmed by a change in the distance measurement result. It is to be noted that it is preferable that the local scanning pattern has a vertically elongated shape in the initial search scan, regardless of the shape of the scanning pattern.

Figure 13A:
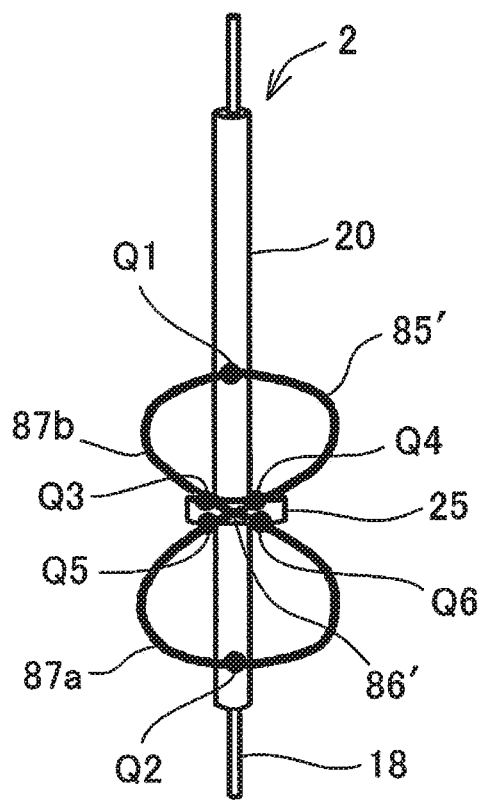
FIG. 13A is an explanatory drawing to show a detection of a reference reflection part by the local scanning pattern and a detection of a tilt of the rover.
Figure 13B:
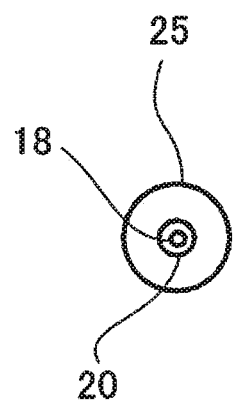
FIG. 13B is a top view of the rover.

FIG. 13A and FIG. 13B show a condition where the local search scan is being executed by the local scanning pattern 85'.

(Step 06) When an intersection 86' of the local scanning pattern 85' comes near the center of the reference reflection part 25, the outward scan 87*a*' and the inward scan 87*b*' of the local scanning pattern 85' pass an edge of the reference reflection part 25. A position of the intersection 86' with respect to the reference reflection part 25 can be measured based on the measurement results of measuring points Q3, Q4, Q5 and Q6 of this edge, and the intersection 86' can be coincided with the center of the reference reflection part 25.

(Step 07) When the intersection 86' is coincided with the center of the reference reflection part 25, the distance measuring optical axis 58 is sighted to the center of the reference reflection part 25, and the measurement of the reference reflection part 25 is executed by the arithmetic control module 26. Further, three-dimensional coordinates of the measuring point P are calculated by the arithmetic control module 26 based on a relationship (a distance) between the reference reflection part 25 and the lower end of the pole 18.

(Step 08, Step 09) Further, by the execution of the local scanning pattern 85', the positions of the upper and lower measuring points Q1 and Q2 (the three-dimensional coordinates) of the linear reflection part 20 are measured. By the three-dimensional coordinates of the measuring points Q1 and Q2, the arithmetic control module 26 can calculate (measure) a hading direction and a hading angle of the pole 18 in a front-and-rear direction and in the left-and-right direction. Further, based on the hading direction and the hading angle of the pole 18 and the relationship (the distance) between the reference reflection part 25 and the lower end of the pole 18, the arithmetic control module 26 can correct the measurement result of the measuring point P.

Further, a hading of the pole 18 obtained here is a hading with respect to the distance measuring optical axis 58, and the distance measuring optical axis 58 itself is not necessarily horizontal. A tilt angle and a tilt direction of the distance measuring optical axis 58 with respect to the reference optical axis O can be measured by the projecting direction detecting module 42. Further, a tilt angle and a tilt direction of the reference optical axis O with respect to the horizontality can be measured by the attitude detector 44.

Therefore, a tilt angle and a tilt direction of the pole 18 with respect to the horizontality or the verticality can be also measured. When the arithmetic control module 26 corrects a measurement result based on the tilt angle and the tilt direction of the pole 18 with respect to the horizontality or the verticality, the arithmetic control module 26 can accurately measure a distance, an elevation angle and a horizontal angle of an accurate measuring point (a point indicated by the lower end of the pole 18) P regardless of the tilt of the pole 18. The measurement result is transmitted to the data collector 3.

Therefore, even in the measurement of a place where the target instrument 2 cannot be supported upright such as a corner of a wall, a corner of a ceiling or the like, for instance, an accurate measurement is possible if the measuring point can be indicated by using the lower end of the pole 18 (the upper end, in case of measuring the ceiling).

(Step 10) When the measurement of the measuring point P is finished, a presence of a measuring point to be measured next is confirmed. When there is no other measuring point to be measured, the measurement is ended.

(Step 11) In a case where the target instrument 2 is moved to a next measuring point, by continuously executing the scanning pattern 85 even during the movement, a tracking of the target instrument 2 (that is, the reference reflection part 25) can be performed. According to the present embodiment, it is only necessary that the scanning pattern 85 just crosses the linear reflection part 20 during the movement, and the tracking can be executed easily and reliably. Further, even if the tracking is discontinued due to an obstacle passing between the surveying instrument 1 and the rover 4, the tracking can be easily recovered.

It is to be noted that the tracking may be executed based on the image. If the illumination light can be captured in the image, the search scan by the surveying instrument 1 can be performed, and thus, it is only necessary for the illuminating lamp 23 to track so that the illumination light from the illuminating lamp 23 is captured in the image.

Further, in the present embodiment, the surveying instrument main body 9 rotates in the left-and-right direction based on the detection result of the second azimuth indicator 31, that is, the irradiating direction of the illumination light so that the reference optical axis C is directed toward the illuminating lamp 23. Therefore, when the target instrument 2 is moved while maintaining a state where the illumination light is emitted toward the surveying instrument main body 9, the illuminating lamp 23 can be tracked by the surveying instrument 1. In this case, during the tracking, the execution of the scanning pattern 85 and the image pickup by the image pickup unit 41 need not to be performed.

As described above, the illumination light is captured by the image pickup unit 41, a rough direction of the reference reflection part 25 is detected by the illumination light in the image, and the distance measuring optical axis 58 is directed toward the direction obtained from the image. Therefore, the image pickup unit 41 functions as an object to be measured detection sensor.

Figure 14:
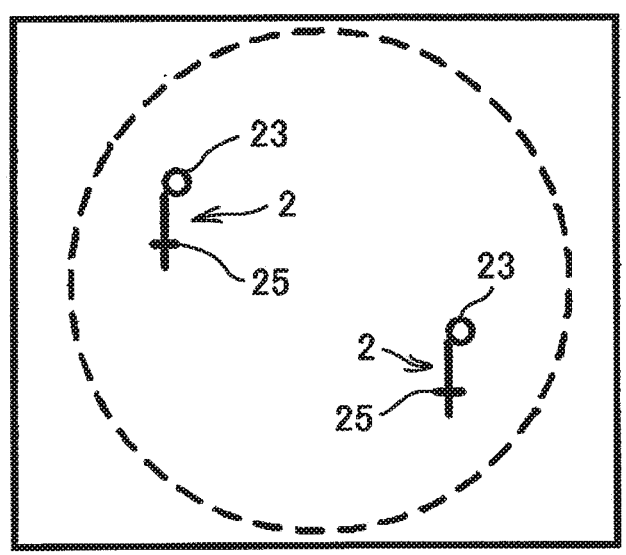
FIG. 14 is an explanatory drawing to show a case where a plurality of rovers is included in an image.

Further, as shown in FIG. 14, the image pickup unit 41 has a wide field angle and can capture a plurality of rovers 4 (the target instruments 2) existing over a wide range at the same time.

In a case where a plurality of rovers 4 is used, one rover of a plurality of rovers 4 may be set as a reference rover in advance. In this case, based on an azimuth angle as received from the reference rover, the arithmetic control module 26 rotates the surveying instrument main body 9 in the left-and-right direction so that the reference optical axis O is directed toward the reference rover.

Alternatively, the second azimuth indicator 31 may be provided on only one rover of a plurality of rovers 4 which is the reference rover. In this case, based on the azimuth angle as received from the rover 4 on which the second azimuth indicator 31 is provided, the arithmetic control module 26 rotates the surveying instrument main body 9 in the left-and-right direction so that the reference optical axis O is directed toward the rover 4 on which the second indicator 31 is provided.

Further, the second azimuth indicators 31 may be provided on a plurality of rovers 4 respectively, and the azimuth angles may be received from each of the second azimuth indicators 31 respectively, and each of the azimuth angles may be averaged. In this case, based on a plurality of the azimuth angles as received, the arithmetic control module 26 averages the azimuth angles as received from a plurality of rovers 4 and rotates the surveying instrument main body 9 in the left-and-right direction so that the reference optical axis O is directed toward an azimuth angle with an average value (average azimuth angle). For instance, in a case where there are two of the rovers 4, as shown in FIG. 14, the arithmetic control module 26 rotates the surveying instrument main body 9 so that the reference optical axis O is directed in a middle of the rovers 4 and 4 in the horizontal direction.

In all of the cases as described above, it is preferable for a plurality of rovers 4 to be all exist in the field angle of the image pickup unit 41.

In a case where a plurality of rovers 4 exists in the field angle of the image pickup unit 41, by adding an identification function with respect to each of the rovers 4, each of the second azimuth indicators 31 may produce an azimuth angle signal and also produce an identification signal. The surveying instrument main body 9 can receive the azimuth angle signals as well as the identification signals, and the arithmetic control module 26 can identify the rovers 4 based on the identification signals, control the optical axis deflector 59 based on an identified result, and sequentially direct (sight) the distance measuring optical axis 58 toward the individual rovers 4.

It is to be noted that, after the reference optical axis O is directed to a predetermined direction, that is, to the reference rover or the average azimuth angle, the surveying instrument main body 9 does not rotate. That is, in a state where the reference optical axis O is fixed, only the distance measuring optical axis 58 is deflected by driving the optical axis deflector 59. Since the distance measuring optical axis 58 can be deflected at a high speed by driving the optical axis deflector 59, measurements can be executed continuously and substantially at the same time for a plurality of rovers 4 by the surveying instrument 1.

Further, in a case where the field angle of the image pickup unit 41 made equal or approximately equal to a maximum deflection angle by the optical axis deflector 59, after once the surveying instrument 1 is installed and the direction of the reference optical axis O is set, measurements can be executed for all the rovers 4 or all the measuring points existing in the measurement range (existing in the field angle of the image pickup unit 41) without changing the direction of the surveying instrument main body 9.

Further, the sighting to each of the rovers 4 (the reference reflection part 25) by the surveying instrument 1 is based on the detection result of the image of the image pickup unit 41, the sighting direction is specified, and the sighting is executed instantaneously.

Next, a description will be given on another method for identifying each of the rovers 4 when a plurality of rovers 4 exists.

A blinking function is added to the illuminating lamp 23, and each of a plurality of illuminating lamps 23 is configured to have a unique blinking mode. For instance, a blinking cycle differs or a turning-on time or a turning-off time differs, or the like. When each of the rovers 4 in the image can be identified, the surveying instrument main body 9 can measure each of the measuring points at which each of the rovers 1 is installed, respectively.

Further, the identification of the rovers 4 may be carried out based on the image acquired by the image pickup unit 41. For instance, it may be so configured that the image acquired by the image pickup unit 41 is displayed on the display unit 35 of the data collector 3, the positions of the individual rovers 4 are detected from the image, identification numbers are added to the individual rovers 4, and the positions of the rovers 4 are associated with the identification numbers and transmitted to the surveying instrument main body 9.

It is to be noted that, in both of a case where one rover 4 exists and a case where a plurality of rovers 4 exists, in order to reliably detect the illumination light when the illuminating lamp 23 is blinked, it is only necessary to acquire an image when turned on and an image when turned off, and obtain a difference between the images by the arithmetic control module 26.

In this case, the synchronization between the blinking of the illuminating lamp 23 and the acquisition of the images by the image pickup unit 41 is carried out in the communication between the second communication module 34 of the data collector and the first communication module 28 of the surveying instrument main body 9.

Alternatively, a GPS may be provided on the data collector 3 and the surveying instrument main body 9, and the blinking of the illumination light and the acquisition of the image may be carried out at a timing based on the time determined in advance by using a GPS time.

As described above, in the present embodiment, the second azimuth indicator 31 is provided on the target instrument 2, the irradiating direction (azimuth angle θ) of the illumination light emitted by the illuminating lamp 23 can be detected based on the detection result of the second azimuth indicator 31, and the azimuth angle θ can be transmitted to the surveying instrument main body 9 via the communication modules 34 and 28. For this reason, in the surveying instrument main body 9, the irradiating direction of the illumination light can be detected, and a direction which is faced with the illumination light (a direction reversed from the irradiating direction of the illumination light) can be calculated.

Therefore, based on the detection result of the first azimuth indicator 10 and the azimuth angle θ as received, the arithmetic control module 26 can automatically rotate the surveying instrument main body 9 in the left-and-right direction so that the reference optical axis C) is directed toward a direction which is faced with and is parallel to the illumination light (θ+180°). Thereby, in order to sight the illumination light, it is no longer necessary to direct the surveying instrument main body 9 toward the target instrument 2 manually or by a remote control from the data collector 3, and a workability can be improved.

Further, the surveying instrument main body 9 is configured to automatically rotate based on the azimuth angle as detected by the second azimuth indicator 31 so that the reference optical axis O is directed toward an opposite direction and is parallel to the optical axis of the illumination light. Therefore, in a state where the illumination light is directed toward the surveying instrument main body 9, by moving the rover 4, the reference optical axis O is constantly directed toward the target instrument 2. As a result, the target instrument 2 need not to be tracked by a continuation of the scan or by an image tracking.

Further, even in a state where the target instrument 2 is not tracked by the surveying device main body 9, by just directing the illumination light toward the surveying instrument main body 9 at a new measuring point, the sighting of the illumination light can be performed. As a result, the measuring point can be easily measured.

In the present embodiment, although the surveying instrument 1 is used as a total station, the surveying instrument 1 can be also used as a laser scanner. The distance measuring light 56 is pulsed-emitted or burst-emitted from the distance measuring light projecting unit 37. As a result, by performing the distance measurement and the angle measurement every each pulsed light or each burst light, point cloud data along the scanning pattern 85 can be acquired.

It is to be noted that, in the present embodiment, the target instrument 2 includes an object to be measured which is a retro-reflector, but the measurement can be performed for an object to be measured which is separated from the rover 4.

In this surveying system, for instance, in a case where the surveying instrument 1 is used as a laser scanner, for instance, in a case where point cloud data is acquired regarding as object to be measured which is a structure or a building, if the target instrument 2 is installed at a position where the point cloud data regarding the object to be measured is to be required, the surveying instrument 1 performs a two-dimensional scanning around the target instrument 2 (the illuminating lamp 23) as a center and can acquire point cloud data of a two-dimensional scanning range.

Further, since a tracking of an illumination light is made possible by performing an image tracking with respect to the image acquired by the image pickup unit 41, by moving the rover 4, the point cloud data of a necessary portion or a necessary point can be acquired.

The invention claimed is:

1. A surveying system comprising a surveying instrument and a rover, wherein said rover has an illuminating lamp for emitting an illumination light toward said surveying instrument, a second azimuth indicator for detecting an azimuth angle of an optical axis of said illumination light and a second communication module which transmits the azimuth angle of the optical axis of said illumination light to said surveying instrument and capable of data communication with said surveying instrument, said surveying instrument comprises a surveying instrument main body and a rotary driving unit capable of rotating said surveying instrument main body in at least a left-and-right direction, wherein said surveying instrument main body comprises a distance measuring light projecting unit for projecting a distance measuring light, a light receiving unit for receiving a reflected distance measuring light and producing a light receiving signal, a distance measuring unit for performing a distance measurement of an object to be measured based on said light receiving signal, an optical axis deflector provided on a distance measuring optical axis and capable of deflecting said distance measuring optical axis two-dimensionally, a projecting direction detecting module for detecting a deflection angle of said distance measuring optical axis and performing an angle measurement, an image pickup unit having an image pickup optical axis in parallel with a reference optical axis which is said distance measuring optical axis in a condition not deflected by said optical axis deflector, a first azimuth indicator for detecting an azimuth angle of said reference optical axis, a first communication module which receives the azimuth angle of said reference optical axis and capable of data communication with said rover, and an arithmetic control module for controlling a deflecting action of said optical axis deflector and a distance measuring action of said distance measuring unit, and wherein said arithmetic control module is configured to receive the azimuth angle of the optical axis of said illumination light detected from said rover by said second azimuth indicator via said first communication module and to calculate the azimuth angle of said reference optical axis which is in parallel or approximately parallel with the optical axis of said illumination light based on the azimuth angle of the optical axis of said illumination light and the azimuth angle of said reference optical axis detected by said first azimuth indicator,
- wherein said arithmetic control module rotates said surveying instrument main body in such a manner that said reference optical axis becomes in parallel or approximately parallel with the optical axis of said illumination light, detects said illumination light based on an image acquired by said image pickup unit, acquires a direction of said illuminating lamp based on a detection result of said illumination light, performs a two-dimensional scanning of said distance measuring light around a direction acquired by said optical axis deflector as a center, and performs a distance measurement and an angle measurement along a scanning path,
- wherein said rover has a retro-reflector of a reflection sheet and has a reference point of said rover at a known position with respect to the optical axis of said illumination light, a reference reflection part around said reference point, and an auxiliary reflection part extending in an up-and-down direction of said reference reflection part, wherein said surveying instrument is configured to detect said reference point based on the reflected distance measuring light from said auxiliary reflection part or said reference reflection part, and said arithmetic control module is configured to make said optical axis deflector to scan said distance measuring optical axis around a direction of said reference point, to perform a three-dimensional measurement of said reference reflection part and said auxiliary reflection part, and to acquire a three-dimensional position of said reference point.

2. The surveying system according to claim 1, wherein said optical axis deflector comprises a pair of optical prisms rotatable around said distance measuring optical axis as a center and motors individually rotating said optical prisms independently, and wherein said arithmetic control module is configured to control a rotating direction, a rotating speed and a rotation ratio of said pair of optical prisms by a driving control of said motors, to control a deflection by said optical axis deflector, and to scan two-dimensionally said distance measuring light.

3. The surveying system according to claim 2, wherein said illuminating lamp is capable of blinking said illumination light, and said arithmetic control module is configured to detect said illumination light based on an image when the light is turned on and an image when the light is turned off.

4. The surveying system according to claim 3, wherein the arithmetic control module is configured to execute a turning-on of said illuminating lamp and an image pickup of said image pickup unit in synchronization with each other.

5. The surveying system according to claim 4, wherein the synchronization of the turning-on of said illuminating lamp and the image pickup of said image pickup unit is executed by a trigger signal transmitted and received between said first communication module and said second communication module.

6. The surveying system according to claim 1, wherein said rovers are provided in plural, and said arithmetic control module is configured to calculate an average azimuth angle based on the azimuth angles of the optical axes of each of said illumination lights received from each of said rovers and to horizontally rotate said surveying instrument main body in such a manner that the azimuth angle of said reference optical axis becomes said average azimuth angle.

7. The surveying system according to claim 6, wherein each of said illuminating lamps of each of said rovers has different blinking modes, and said arithmetic control module is configured to identify each of said rovers based on each of the blinking modes.

8. The surveying system according to claim 2, wherein said rovers are provided in plural, and said arithmetic control module is configured to calculate an average azimuth angle based on the azimuth angles of the optical axes of each of said illumination lights received from each of said rovers and to horizontally rotate said surveying instrument main body in such a manner that the azimuth angle of said reference optical axis becomes said average azimuth angle.

9. The surveying system according to claim 3, wherein said rovers are provided in plural, and said arithmetic control module is configured to calculate an average azimuth angle based on the azimuth angles of the optical axes of each of said illumination lights received from each of said rovers and to horizontally rotate said surveying instrument main body in such a manner that the azimuth angle of said reference optical axis becomes said average azimuth angle.

10. The surveying system according to claim 4, wherein said rovers are provided in plural, and said arithmetic control module is configured to calculate an average azimuth angle based on the azimuth angles of the optical axes of each of said illumination lights received from each of said rovers and to horizontally rotate said surveying instrument main body in such a manner that the azimuth angle of said reference optical axis becomes said average azimuth angle.

11. The surveying system according to claim 5, wherein said rovers are provided in plural, and said arithmetic control module is configured to calculate an average azimuth angle based on the azimuth angles of the optical axes of each of said illumination lights received from each of said rovers and to horizontally rotate said surveying instrument main body in such a manner that the azimuth angle of said reference optical axis becomes said average azimuth angle.

12. The surveying system according to claim 8, wherein each of said illuminating lamps of each of said rovers has different blinking modes, and said arithmetic control module is configured to identify each of said rovers based on each of the blinking modes.

13. The surveying system according to claim 9, wherein each of said illuminating lamps of each of said rovers has different blinking modes, and said arithmetic control module is configured to identify each of said rovers based on each of the blinking modes.

14. The surveying system according to claim 10, wherein each of said illuminating lamps of each of said rovers has different blinking modes, and said arithmetic control module is configured to identify each of said rovers based on each of the blinking modes.

15. The surveying system according to claim 11, wherein each of said illuminating lamps of each of said rovers has different blinking modes, and said arithmetic control module is configured to identify each of said rovers based on each of the blinking modes.

* * * * *